(12) United States Patent
Kuwabara et al.

(10) Patent No.: US 7,668,314 B2
(45) Date of Patent: Feb. 23, 2010

(54) SYSTEM AND METHOD FOR COMMUNICATING ENCRYPTED DATA

(75) Inventors: Munemitsu Kuwabara, Kodaira (JP); Sumie Nakabayashi, Kokubunji (JP)

(73) Assignee: Hitachi Kokusai Electric, Inc., Tokyo (JP)

( * ) Notice: Subject to any disclaimer, the term of this patent is extended or adjusted under 35 U.S.C. 154(b) by 760 days.

(21) Appl. No.: 11/362,081

(22) Filed: Feb. 27, 2006

(65) Prior Publication Data
US 2006/0222178 A1 Oct. 5, 2006

(30) Foreign Application Priority Data
Mar. 30, 2005 (JP) .............................. 2005-097250

(51) Int. Cl.
*H04L 9/00* (2006.01)
(52) U.S. Cl. ..................... 380/261; 380/244; 380/267
(58) Field of Classification Search ................ 380/260, 380/267, 244, 261; 375/375
See application file for complete search history.

(56) References Cited

U.S. PATENT DOCUMENTS

| | | | | |
|---|---|---|---|---|
| 5,321,440 A | * | 6/1994 | Yanagihara et al. | 375/240.2 |
| 5,517,502 A | * | 5/1996 | Bestler et al. | 370/449 |
| 6,158,026 A | * | 12/2000 | Kawahara | 714/701 |
| 2001/0034729 A1 | * | 10/2001 | Azadet et al. | 707/1 |
| 2001/0036269 A1 | * | 11/2001 | Morinaga et al. | 380/203 |
| 2004/0013052 A1 | * | 1/2004 | Sako et al. | 369/30.05 |
| 2004/0085446 A1 | * | 5/2004 | Park | 348/143 |
| 2004/0139336 A1 | * | 7/2004 | McLean et al. | 713/189 |

* cited by examiner

*Primary Examiner*—Kambiz Zand
*Assistant Examiner*—Michael Guirguis
(74) *Attorney, Agent, or Firm*—Brundidge & Stanger, P.C.

(57) ABSTRACT

An encrypted data communication system for communicating an encrypted stream as an encrypted data stream from a device at transmitting end to a device at receiving end to suppress the effect of an erroneous detection of a dummy code is disclosed. A device at transmitting end generates a data stream having the bit sequence of a marker for determination, a synchronization marker and a location identification code after the data, encrypts the bit sequence of the data and the marker for determination and transmits the encrypted stream. A device at receiving end receives the encrypted stream, detects the bit sequence of the synchronization marker and the location identification code and decrypts the encrypted stream. In the case where the bit sequence of the data and the marker for determination is decrypted, the detection of the valid bit sequence is determined, while the detection of a dummy bit sequence is determined otherwise.

7 Claims, 19 Drawing Sheets

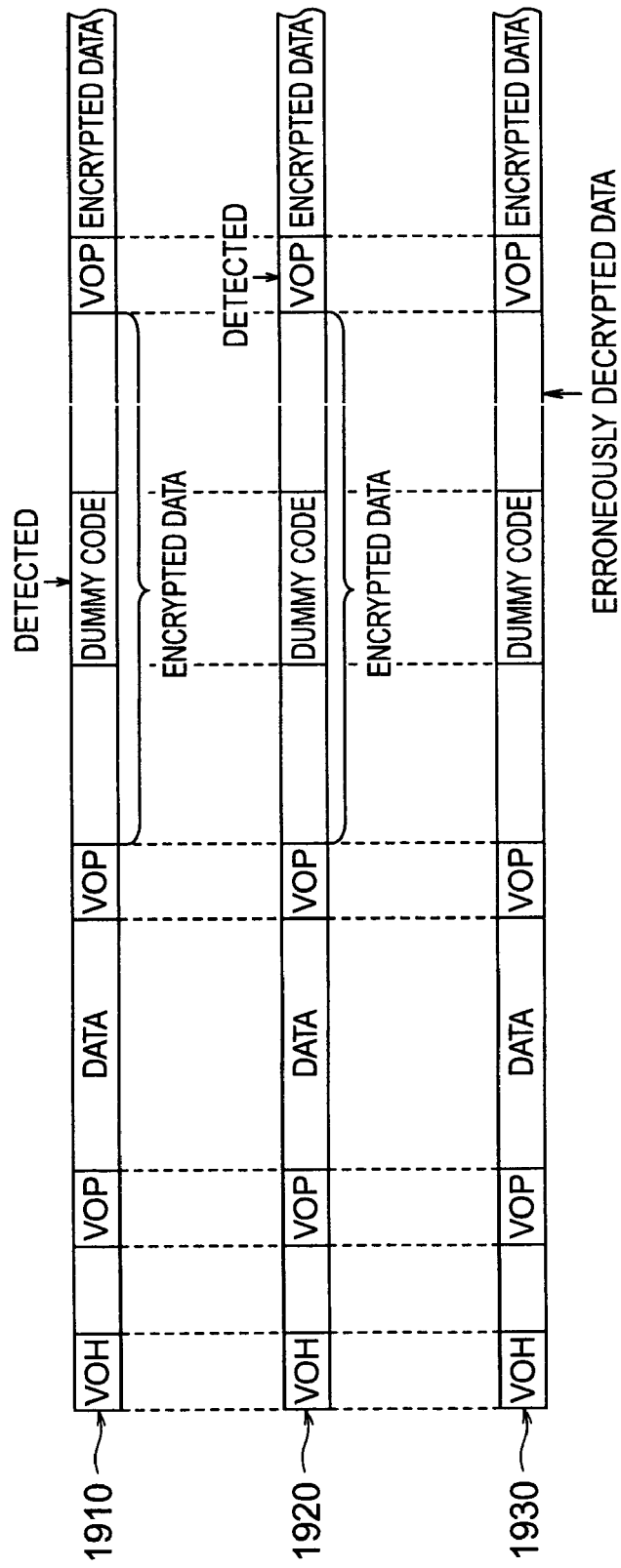

SYSTEM AND METHOD FOR COMMUNICATING ENCRYPTED DATA

INCORPORATION BY REFERENCE

The present application claims priority from Japanese application JP2005-097250 filed on Mar. 30, 2005, the content of which is hereby incorporated by reference into this application

BACKGROUND OF THE INVENTION

This invention relates to an encrypted data communication system for communicating the encrypted data, or in particular to a technique for suppressing the effect of erroneously detecting a dummy code contained in the encrypted data as a location identification code (such as a start code).

In recent years, a method has spread widely in which the video data is encoded (and compressed) digitally to generate a video stream which is distributed to terminal units (clients) from a server.

As a method of distributing video data only to limited terminal units, the method of encrypting the non-header part of the video stream has been conceived. In this method, correct video data reproduction is possible by the terminal units having a cryptographic key. The terminal units having no cryptographic key, however, can obtain only the video data of a deteriorated image quality.

The applicants considers that the above described conventional technique is already known prior art. The present applicants, however, could not find the appropriate document as of the time of filing the basic Japanese application, and therefore the document information of the prior art are not described.

SUMMARY OF THE INVENTION

In the technique described above, the video stream with the non-header part thereof encrypted (hereinafter referred to also as the encrypted stream) by the device at transmitting end is required be reproduced by the personal computer at receiving end by detecting a start code and decrypting the non-header part from the encrypted stream.

The start code assumes a unique value in the video stream but not necessarily in the encrypted stream. In detecting the start code from the encrypted stream, therefore, the data of the same value as the start code contained in the encrypted stream (hereinafter referred to also as the dummy code) is sometimes erroneously detected as the a valid start code.

In such a case, the random number string at transmitting end and the random number string at receiving end go out of phase from each other. At receiving end, therefore, the non-header part cannot be decrypted correctly, thereby posing the problem that the reproduced image cannot be correctly displayed.

An example of the MPEG-4 stream is described below.

This stream is configured as "video_object_start_code" ... "vop_start_code" "header of several bytes" "VOP data (Macroblock)" "vop_start_code" "header of several bytes" "VOP data (Macroblock)" ... "vop_start_code" "header of several bytes" "VOP data (Macroblock)""video_object_start_code" ...

The "video_object_start_code" and "vop_start_code" are start codes.

The "video_object_start_code" is a component element of the VO (Visual Object) header, and a four-byte unique code including (00 00 01 01)h.

The only component element of the VOH is "video_object_start_code" and hereinafter referred to also as the VOH for the convenience of explanation.

Generally, the VOP (Video Object Plane) header is configured of "vop_start_code" and "header of several bytes". The "vop_start_code" is located at the head of the VOP header.

The "vop_start_code" is a four-byte unique code including (00 00 01 B6)h, and in the description that follows, referred to also as the VOP for the convenience of explanation.

The "VOP data (Macroblock)" is encrypted in its entirety.

The "header of several bytes", however, may or may not be encrypted in its entirety or only a part thereof may be encrypted.

In MPEG-4, for example, the start code is 4 bytes, and the probability of erroneously detecting a dummy code in the encrypted stream is once for about five hours for the coding rate of 2 Mbps.

Specifically, in the case where the coding rate is 2 Mbps, the time interval at which the probability of detecting a dummy code is given as $2^{4 \times 8}(\text{bit})/\{2 \text{ M}(\text{bit/sec})/8\} = (2^{32}/250000) (\text{sec}) \approx 17180. (\text{sec}) \approx 286 (\text{min}) \approx 4.8 (\text{h})$. Thus, a four-byte dummy code appears in the encrypted stream at the rate of about once for every 5 hours.

A specific explanation is made below with reference to 1810 to 1850 of FIG. 18 and 1910 to 1930 of FIG. 19.

In FIG. 18, numerals 1810 to 1850 designate examples of the manner in which the video stream is encrypted and decrypted.

Numeral 1810 in FIG. 18 designates an example of the video stream before encryption by the device at transmitting end. This video stream is configured of the VOH (indicating "video_object_start_code" in this embodiment) followed by at least one set of the VOP (indicating "vop_start_code" in this embodiment) and the data.

In FIG. 18, numeral 1820 designates an example of the encrypted stream generated by encrypting the non-header part by the device at transmitting end. In this encrypted stream, the data part other than the header is encrypted as encrypted data. Also, in this embodiment, "header of several bytes" following VOP is also encrypted.

Numeral 1830 in FIG. 18 designates the manner in which the VOP is detected from the encrypted stream by the device at receiving end.

Numeral 1840 in FIG. 18 designates an example of the manner in which the VOP next (adjacent) to the aforementioned VOP is detected from the encrypted stream by the device at receiving end.

Numeral 1850 in FIG. 18 designates an example of the manner in which the encrypted data between the aforementioned two detected VOPs is decrypted.

Numerals 1910 to 1930 in FIG. 19 designate an example of the manner in which a dummy code is erroneously detected by the device at receiving end.

In FIG. 19, numeral 1910 designates an example of the manner in which the dummy code is erroneously detected from the encrypted stream by the device at receiving end. In this example, the encrypted data contains a bit string having the same value as VOP, which is erroneously determined and detected as a start code (VOP).

In FIG. 19, numeral 1920 designates the manner in which the VOP next (adjacent) to the aforementioned dummy code is detected from the encrypted stream by the device at receiving end.

In FIG. 19, numeral 1930 designates the manner in which the encrypted data between neighboring two VOPs (one of which is a dummy code in this embodiment) detected by the device at receiving end is decrypted.

Once the dummy code is erroneously detected by the device at receiving end as described above, the encrypted data cannot be normally decrypted, and the reproduction of an image with a high accuracy becomes impossible.

This invention has been developed in view of the above-mentioned situation of the prior art and the object thereof is to provide an encrypted data communication system capable of suppressing the effect of erroneously detecting the dummy code in the encrypted data as a valid location identification code (such as a start code) in the encrypted data communication.

The effect of erroneous detection is suppressed by reducing the probability of erroneous detection or preventing the erroneously detected dummy code from being left as it is.

In order to achieve this object, according to this invention, there is provided an encrypted data communication system in which the process described below is executed for communication of the encrypted stream including the encrypted data stream from the device at transmitting end to the device at receiving end.

Specifically, in the device at transmitting end, an insert unit inserts a predetermined synchronization marker before or after the location identification code contained in the encrypted stream and a transmitter transmits the encrypted stream with the inserted synchronization marker.

In the device at receiving end, a receiver receives the encrypted stream, a detector detects the bit sequence of the synchronization marker and the location identification code or the bit sequence of the location identification code and the synchronization marker contained in the received encrypted stream, and a decryptor decrypts the received encrypted stream based on the result of the detection.

In decrypting the encrypted stream, therefore, the synchronization marker is secured by detecting the bit sequence of the synchronization marker and the location identification code or the bit sequence of the location identification code and the synchronization marker. As compared with the case where the sync is secured by detecting only the location identification code, therefore, the amount of the object (number of bits, for example) to be detected can be increased.

In communication of the encrypted data, therefore, it is possible to suppress the effect of erroneously detecting a dummy code contained in the encrypted data (in this embodiment, a dummy code that is invalid but looks like valid) as the proper location identification code (the bit sequence, in this embodiment). Specifically, the probability of erroneous detection can be reduced.

The devices at transmitting and receiving ends used in this case may be a transceiver (communication device) having both the transmission and receiving functions.

Various data streams can be used such as the compressed video (image) data stream according to MPEG-4.

Also, the data stream contains, for example, the location identification code and the data. The location identification code may be additionally inserted into the data stream.

Various encryption schemes may be used.

The location identification code may also be any of various types including the start code such as "video_object_start_code", "vop_start_code" or other codes.

In the case where the synchronization marker is inserted before the location identification code, the bit sequence of the synchronization marker and the location identification code is detected, while in the case where the synchronization marker is inserted after the location identification code, on the other hand, the bit sequence of the location identification code and the synchronization marker is detected.

Also, various types of the synchronization marker can be used. In the case where the synchronization marker is required to be deleted after decryption, the device at receiving end includes a deletion unit for deleting the decrypted synchronization marker.

The encrypted data communication system according to this invention is configured as shown below, for example.

Specifically, the data stream is compressed by a compressor and the data stream decrypted is expanded by an expander. Also, a stuffing code is used as the synchronization marker.

In the case where the stuffing code is used as the synchronization marker as described above, the stuffing code is ignored in the expansion process. Therefore, the synchronization marker (stuffing code according to this embodiment) can be left without being deleted from the decryption result, thereby making it possible to increase the speed of decryption process.

The compressor and the expander can be of any of various types such as the one corresponding to the MPEG-4 scheme.

The compressor is arranged in the device at transmitting end, for example, or other devices.

The expander, on the other hand, is arranged in the device at receiving end or other devices.

Also, the stuffing code may be the stuffing bit for the MPEG-4 scheme, the stuffing byte for the MPEG-2 scheme, or the zero byte for H.264 scheme. A code corresponding to the stuffing code may also be employed in other systems using other frame formats.

In the encrypted data communication system according to this invention, the following process is executed in communication of the encrypted data stream from the device at transmitting end to the device at receiving end.

Specifically, in the device at transmitting end, an encryptor encrypts the bit sequence of the data contained in the data stream and a predetermined marker for determination and a transmitter transmits the encrypted stream obtained by the encryption.

In the device at receiving end, the receiver receives the encrypted stream, a detector detects the location identification code contained the received encrypted stream, a decryptor decrypts the encrypted stream based on the detection result, and a determining unit determines, based on the decryption result, that the valid location identification code is detected in the case where the bit sequence of the data and the marker for determination is decrypted, while determining that a dummy code is detected otherwise.

In the case where the bit sequence of the data and the marker for determination is decrypted, i.e. in the case where the marker for determination appears after the data as the result of decryption of the encrypted stream, therefore, it is determined that a valid location identification code is detected and decrypted, while in the case where the bit sequence of the data and the marker for determination fails to be decrypted, i.e. in the case where no marker for determination appears after the data, on the other hand, it is determined that a dummy code is erroneously detected and decrypted.

In the communication of the encrypted data, therefore, it is possible to suppress the effect of the erroneous detection of the dummy code contained in the encrypted data as the valid location identification code. Specifically, in the case of an erroneous detection, for example, the decrypted data is returned to the encrypted data and the location identification code is retrieved again to prevent the detection error from being left as it is.

Various types of markers may be used as the predetermined marker for determination, such as the location identification code originally contained in the data stream or the marker for determination inserted in the data stream.

Also, a predetermined marker for determination unique to the stream, for example, is used. In the case where the deletion of the marker for determination is required after decryption, for example, the device at receiving end includes a deletion unit for deleting the decrypted marker for determination.

The data stream contains the location identification code such as the start code and the data. The location identification code such as the start code or the synchronization marker may be inserted additionally in the data stream.

Further, the location identification code detected for decryption may be the one contained originally in the data stream or the one inserted additionally to the data stream.

Also, the location identification code detected for decryption may be a combination of the start code or the like and the synchronization marker.

An example of the configuration of the encrypted data communication system according to this invention is described below.

Specifically, the data stream is compressed by the compressor, and the data stream obtained by decryption is expanded by the expander. In the device at receiving end, the converter converts the decrypted marker for determination into the stuffing code.

After decryption, therefore, the marker for determination is replaced by the stuffing code, which is ignored at the time of expansion. In this way, the marker for determination (the stuffing code in this embodiment) can be left without being deleted from the result of decryption, thereby making it possible to increase the decryption speed.

Another example of the configuration of the encrypted data communication system according to this invention is described below.

Specifically, in the device at transmitting end, an insertion unit inserts the same location identification marker as the location identification code originally contained in the data stream. As the predetermined marker for determination, the location identification code originally contained in the data stream or the location identification marker inserted in the data stream is used.

In the device at receiving end, on the other hand, the location identification code originally contained in the data stream or the location identification marker inserted in the data stream is deleted from the decryption result by the deletion unit.

In the device at transmitting end, therefore, the location identification marker is inserted before or after the location identification marker originally contained in the data stream, and the data and the marker for determination (the location identification code or the location identification marker, whichever is located forward (on the data side)) are encrypted.

In the device at receiving end, on the other hand, the other one of the location identification code and the location identification marker (whichever is located rearward) is detected and decrypted, and based on whether the data and the marker for determination is decrypted or not, it is determined whether the decryption is valid or not. As a result, the erroneous detection of the dummy code is prevented from being left as it is.

Also, in the device at receiving end, one of the double location identification codes (the location identification code and the location identification marker in this case) after decryption is deleted, and one location identification code (the location identification code or the location identification marker in this case) is left as it is.

This example described above is so configured that the same location identification marker as the location identification code is inserted and the location identification code or the location identification marker is used a marker for determination. As an alternative, a marker different from the location identification code can be inserted in the case where the inserted marker is not necessarily the same as the location identification code such as in the case where the inserted marker is deleted or converted to the stuffing code after decryption.

In the encrypted data communication system according to this invention, the following process is executed in the communication of the encrypted data stream from the device at transmitting end to the device at receiving end.

Specifically, in the device at transmitting end, a generating unit generates a data stream having, following the data, the bit sequence of a predetermined marker for determination, a predetermined synchronization marker and a predetermined location identification code or the bit sequence of a predetermined marker for determination, a predetermined location identification code and a predetermined synchronization marker, an encryptor encrypts the bit sequence of the data and the marker for determination contained in the data stream generated, and a transmitter transmits the encrypted stream obtained by the encryption.

In the device at receiving end, a receiver receives the encrypted stream, a detector detects the bit sequence of the synchronization marker and the location identification code or the bit sequence of the location identification code and the synchronization marker contained in the encrypted stream received, a decryptor decrypts the encrypted stream based on the detection result, and a determining unit, based on the decryption result, determines that the valid bit sequence of the synchronization marker and the location identification code or the valid bit sequence of the location identification code and the synchronization marker is detected in the case where the bit sequence of the data and the marker for determination is decrypted on one hand, while determining that a dummy bit sequence is detected otherwise.

In decrypting the encrypted stream, the synchronization is taken by detecting the bit sequence of the synchronization marker and the location identification code or the bit sequence of the location identification code and the synchronization marker. As compared with the case in which the synchronization marker is taken by detecting only the location identification code, therefore, the amount of the object to be detected (number of bits, for example) can be increased.

As a result, in the communication of the encrypted data, it is possible to suppress the effect of erroneous detection of the dummy code (a code seemingly identical to any of the aforementioned bit sequences in this case) contained in the encrypted data as a valid location identification code (any the aforementioned bit sequences in this case). Specifically, the probability of erroneous detection can be reduced.

At the same time, in the case where the bit sequence of the data and the marker for determination is decrypted, i.e. in the case where the marker for determination appears after the data in the decryption result of the encrypted stream, it is determined that the valid location identification code is detected and decrypted. In the case where the bit sequence of the data and the marker for determination is not decrypted, i.e. in the case where the marker for determination fails to appear after the data, on the other hand, it is determined that the dummy code is erroneously detected and decrypted.

As a result, in the communication of the encrypted data, it is possible to suppress the effect of erroneous detection of the dummy code contained in the encrypted data as the valid location identification code. Specifically, an erroneously detected code, if any, is returned to the encrypted data stream and the location identification code is retrieved, thereby preventing the erroneous detection from being left as it is.

The data stream contains, for example, the location identification code and the data. As an alternative, the location identification code may be additionally inserted into the data stream.

Also, in the case where the bit sequence of the data, the marker for determination, the synchronization marker and the location identification code is used, the bit sequence of the data and the marker for determination is encrypted, while the bit sequence of the synchronization marker and the location identification code is detected at the time of decryption.

In the case where the bit sequence of the data, the marker for determination, the location identification code and the synchronization marker is used, on the other hand, the bit sequence of the data and the marker for determination is encrypted, while the bit sequence of the location identification code and the synchronization marker is detected at the time of decryption.

As another example of the configuration, a data stream having the bit sequence of the marker for determination and the location identification code after the data is generated, an encrypted stream is generated by encrypting the bit sequence of the data and the marker for determination, and the synchronization marker is inserted before or after the location identification code contained in the encrypted stream thereby to generate the bit sequence of the data, the marker for determination, the synchronization marker and the location identification code or the bit sequence of the data, the marker for determination, the location identification code and the synchronization marker.

This invention can be provided also as a method, a program or a recording medium.

In a method according to the invention, the various processes are executed by various parts of a system or an apparatus.

A program according to this invention is executed by a computer making up a system or an apparatus, and the various functions are implemented by the computer.

In a recording medium according to the invention, the program executed by the computer making up the system or the apparatus is recorded in the form readable by an input unit of the computer, and various processes of the program are executed by the computer.

As described above, with the encrypted data communication system according to this invention, a combination of the synchronization marker and the location identification code is detected at the time of decrypting the encrypted stream, and therefore the probability of erroneous detection of the dummy code is reduced as compared with a case in which the location identification code alone is detected.

Also, with the encrypted data communication system according to the invention, the bit sequence of the data and the marker for determination is encrypted and it is determined whether this bit sequence is validly decrypted or not. The erroneous detection, if any, of the dummy code at the time of decryption, therefore, can be grasped and corrected.

Also, with the encrypted data communication system according to the invention, the use of both the synchronization marker and the marker for determination can suppress the effect of erroneous detection of the dummy code, thereby improving the accuracy of decryption and data reproduction.

Also, with the encrypted data communication system according to the invention, the use of the stuffing code can increase the rate of decryption process.

Other objects, features and advantages of the invention will become apparent from the following description of the embodiments of the invention taken in conjunction with the accompanying drawings.

BRIEF DESCRIPTION OF THE DRAWINGS

FIG. 19 is a diagram showing an example of the manner in which the dummy code in the encrypted stream is erroneously detected according to the prior art.

DESCRIPTION OF THE EMBODIMENTS

Embodiments of the invention are explained below with reference to the drawings.

Figure 1:
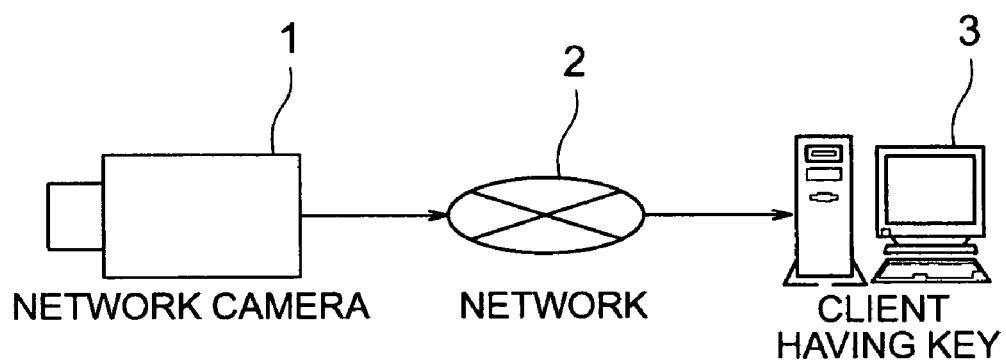
FIG. 1 is a diagram showing an example of the encrypted data communication system according to an embodiment of the invention.

An example of the encrypted data communication system according to an embodiment is shown in FIG. 1.

The encrypted data communication system according to this embodiment comprises a network camera 1, a network 2 and a terminal unit (client) 3. An encrypted stream is distributed from the network camera 1 to the terminal unit 3 through the network 2.

The network camera 1 encrypts the non-header part of the video stream with a cryptographic key, and outputs it to the network 2.

The terminal unit 3 is, for example, a personal computer functioning as a client and has stored therein a key corresponding to the cryptographic key used in the network camera 1, and by using this key, decrypts the encrypted stream received from the network camera 1, thereby permitting the image to be viewed.

Figure 2:
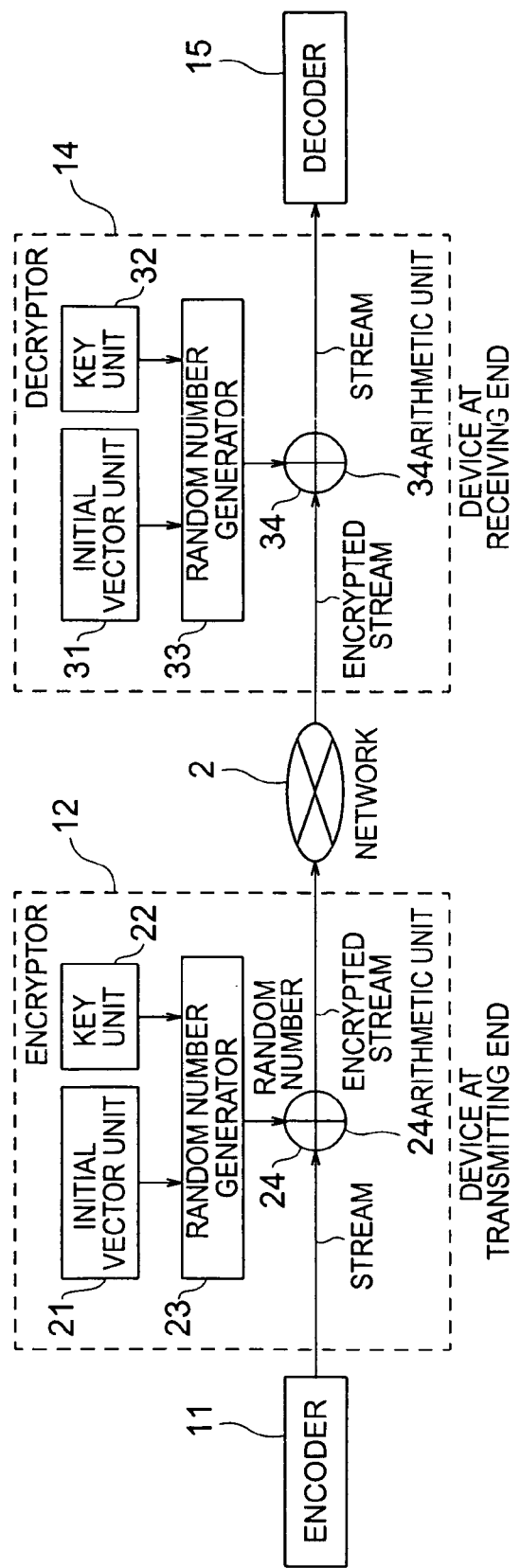
FIG. 2 is a diagram showing an example of the configuration of an encrypted data communication system.

FIG. 2 shows an example of a specific configuration of an encrypted data communication system.

The encrypted data communication system according to this embodiment comprises a device at transmitting end (transmitting-end device) including an encoder 11 and an encryptor 12, a network 2 and a device at receiving end (receiving-end device) including a decryptor 14 and a decoder 15.

The encryptor 12 includes an initial vector unit 21, a key unit 22, a random number generator 23 and an arithmetic unit 24.

The decryptor 14 includes an initial vector unit 31, a key unit 32, a random number generator 33 and an arithmetic unit 34.

The device at transmitting end and the device at receiving end each include a control unit (not shown) for executing various data processing and control operations.

Also, though not shown, a configuration may be employed in which the network 2 is connected with a data accumulation and distribution unit. In this data accumulation and distribution unit, the data transmitted from the device at transmitting end is accumulated in a disk unit (a recording unit randomly accessible for data accumulation) and distributed at the request of the device at receiving end.

An example of the operation of the device at transmitting end is explained.

The encoder 11 encodes the video stream to be transmitted (compressed by MPEG-4 scheme according to this embodiment) and outputs it to the encryptor 12.

In the encryptor 12, the initial vector unit 21 outputs an initial vector, the key unit 22 outputs a key, the random number generator 23 outputs by generating a random number using the initial vector and the key, and the arithmetic unit 24 acquires an encrypted stream by the exclusive-OR operation of the video stream input from the encoder 11 and the random number input from the random number generator 23. The encrypted stream is sent to the device at receiving end through the network 2.

In the device at transmitting end, the control unit can variously process the video stream and the encrypted stream.

An example of the operation of the device at receiving end is explained below.

In the decryptor 14, the initial vector unit 31 outputs an initial vector, the key unit 32 outputs a key, the random number generator 33 outputs by generating a random number using the initial vector and the key, and the arithmetic unit 34 decrypts the encrypted stream received from the device at transmitting end by the exclusive-OR operation of the encrypted stream input through the network 2 and the random number input from the random number generator 33. The original video stream thus acquired is output to the decoder 15.

In the decoder 15, the video stream input from the decryptor 14 is decoded (expanded from the state compressed by MPEG-4 scheme in this embodiment).

In the encryptor 12 of the device at transmitting end and the decryptor 14 of the device at receiving end, the initial vectors and the keys corresponding to each other are used, and the timing of the random number generation is synchronized.

In the device at receiving end, the control unit can perform various operations of processing the encrypted stream and the video stream after decryption.

The device at transmitting end according to this embodiment includes the functions such as a compressor for encoding by compression of the video signal, an encryptor for encrypting the compressed video stream (data stream), an insertion unit for inserting the synchronization marker and the marker for determination (the start code, for example, in this embodiment) into the data stream and the encrypted stream, a transmitter for transmitting the encrypted stream, and a generating unit for generating a predetermined data stream.

The device at receiving end according to this embodiment, on the other hand, includes the functions of a receiver for receiving the encrypted stream, a detector for detecting the start code and the synchronization marker, a decryptor for decrypting the encrypted stream, a deletion unit for deleting the synchronization marker and the marker for determination, a determining unit for determining whether the dummy code is erroneously detected or not, a converter for converting the marker for determination to the stuffing code (the stuffing bit in this embodiment) and an expander for expanding the data stream.

The embodiments described below represent a case in which the "header of several bytes" contained in the VOP header is also encrypted. Nevertheless, the "header of several bytes" may not be encrypted or only a part of the "header of several bytes" may be encrypted.

Embodiment 1

A first embodiment of the invention is explained below.

EXAMPLE 1-1

Figure 3:
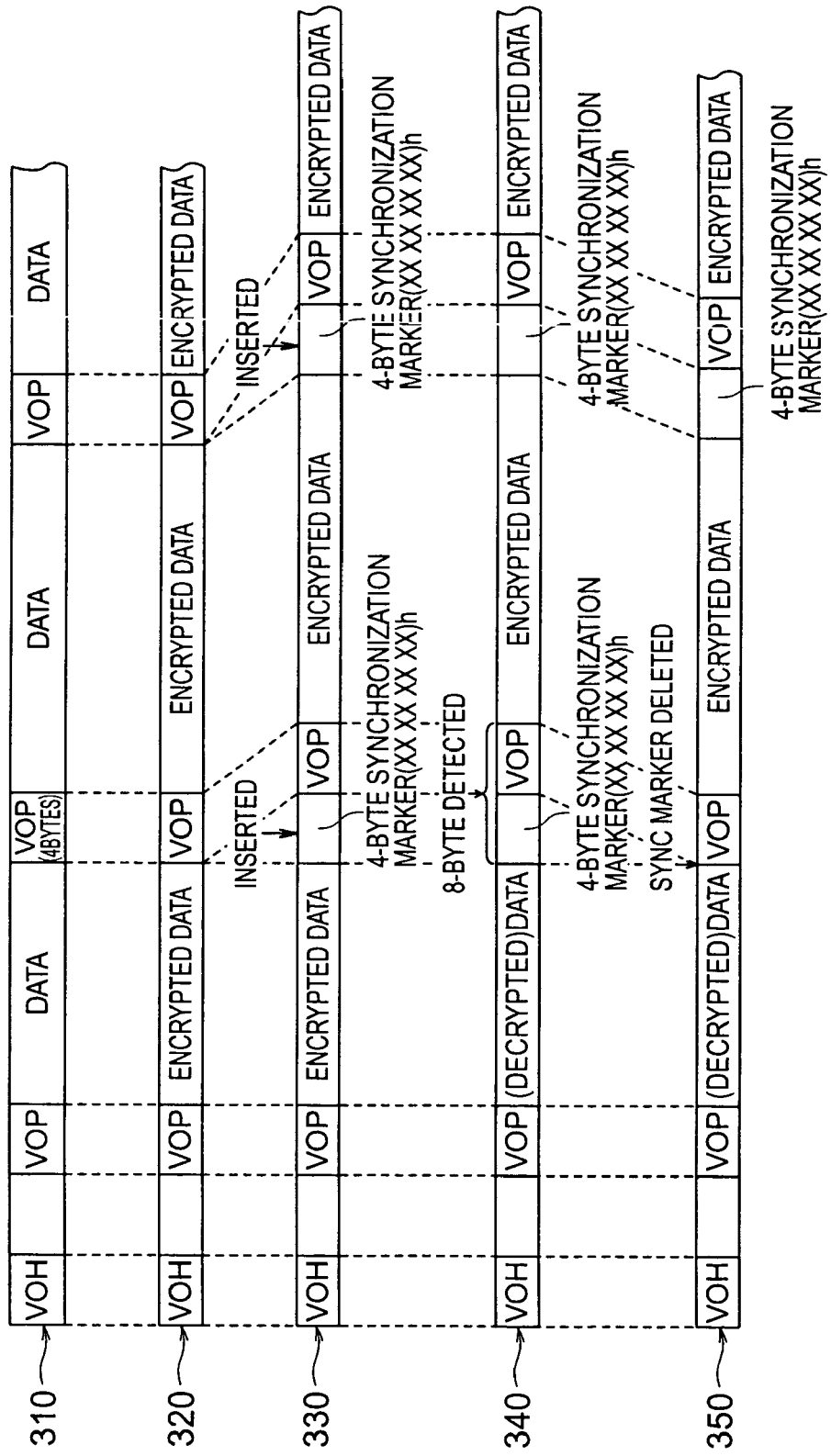
FIG. 3 is a diagram showing an example of the manner in which a synchronization marker is added after the encrypted non-header part in the VOP-based encryption.

In FIG. 3, numerals 310 to 350 designate an example of the VOP-based encryption by the scheme in which the synchronization marker is attached after the encrypted non-header part. In this example, the synchronization marker has 4 bytes.

In this example, the VOP (indicating "vop_start_code") is used as a code for location identification in encryption or decryption.

In FIG. 3, numeral 310 designates an example of the video stream before encryption by the device at transmitting end. This video stream is configured of at least one set (three sets in this example) of the VOP and the data following the VOH (indicating "video_object_start_code" in this example). In this example, the VOH has 4 bytes and so does the VOP.

In FIG. 3, numeral 320 designates an example of the encrypted stream generated by encrypting the non-header part by the device at transmitting end. In this encrypted stream, the data portion other than the header (non-header part) is encrypted and constitutes the encrypted data. Also, in this example, the "header of several bytes" following each VOP is also encrypted.

In FIG. 3, numeral 330 designates an example of the encrypted stream into which the four-byte synchronization marker (indicated by "(XX XX XX XX)h" in FIG. 3) is inserted after the encrypted data by the device at transmitting end.

In FIG. 3, numeral 340 designates an example in which eight bytes of the synchronization marker and the VOP is detected from the encrypted stream by the device at receiving end, and the preceding encrypted data is decrypted and inserted into the original stream.

In FIG. 3, numeral 350 designates an example in which the synchronization marker is deleted from the encrypted stream and the portion following the synchronization marker is moved forward by the device at receiving end.

An example of the device at transmitting end is explained below.

In the device at transmitting end, the four-byte VOH and then four-byte VOP are detected from the video stream designated by 310 in FIG. 3. Upon detection of the next four-byte VOP, as indicated by 320 in FIG. 3, the data between the detected neighboring two VOPs (i.e. the VOP data and the "header of several bytes" following the VOP) is encrypted with a cryptographic key. Next, as indicated by 330 in FIG. 3, the synchronization marker is attached after the encrypted non-header part (the encrypted VOP data in this example) and output to the network 2. The VOP data indicates the data arranged following the VOP header ("vop_start_code" and "header of several bytes").

An example of the operation of the device at receiving end is explained below.

In the device at receiving end, the four-byte VOH is detected from the encrypted stream, and then the four-byte VOP is detected. Next, upon detection of a total of 8 bytes (synchronization marker+VOP), as indicated by 340 in FIG. 3, the data between the detected VOP and the neighboring "synchronization marker+VOP" is decrypted with the cryptographic key. As indicated by 350 in FIG. 3, the four-byte synchronization marker is deleted, and the following stream is moved forward. After that, a similar operation is performed repeatedly for all the encrypted data.

In the configuration for detecting a total of 8 bytes of "synchronization marker+VOP" by the device at receiving end as in this example, the probability of erroneous detection of the dummy code in the encrypted stream is as low as about once per 2.3 million years, for example, for the coding rate is 2 Mbps. Specifically, in the case where the coding rate is 2 Mbps, the interval of dummy code detection is given as $2^{8 \times 8}$ (bit)/$\{2$ M(bit/sec)/8$\}=(2^{64}/250000)$ (sec)$\approx$2339769 (years) $\approx$2.3 million years. Thus, the 8-byte dummy code appears in the encrypted stream only about once for every 2.3 million years.

As described above, by adding the synchronization marker after the encrypted non-header part of the video stream at the time of encryption, the probability of erroneously detecting the dummy code contained in the encrypted stream as a valid start code is reduced.

This example represents a configuration in which the synchronization marker is inserted after the encrypted non-header part (before VOP). Alternatively, the location at which the synchronization marker is inserted is not limited to such a position. Using a configuration in which the synchronization marker is inserted after VOP, for example, a similar effect to this example can be obtained. In the case where the synchronization marker is inserted after VOP, the bit sequence of, for example, "encrypted VOP data", "vop_start_code", "synchronization marker", "header of several bytes" and "encrypted VOP data" is generated.

EXAMPLE 1-2

Figure 4:
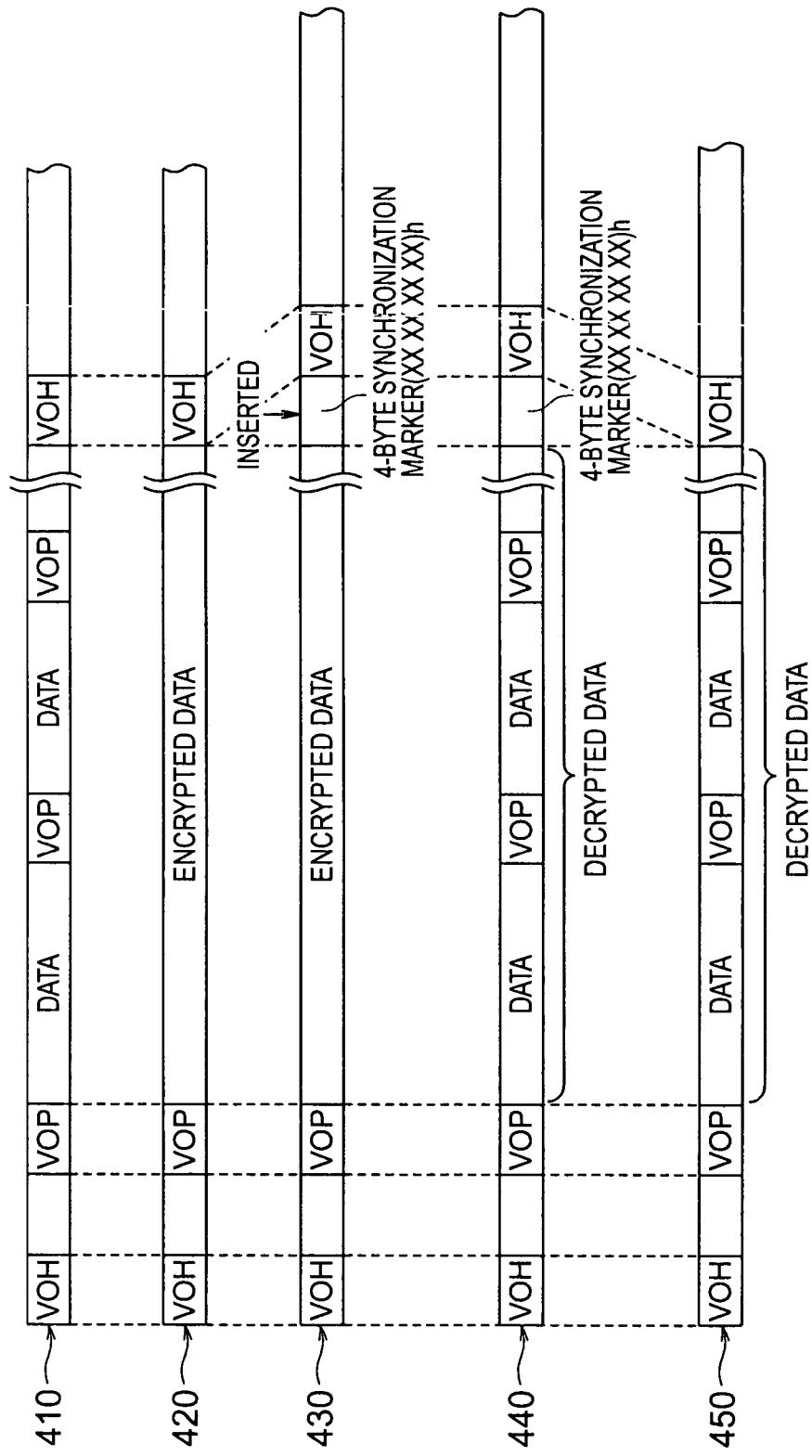
FIG. 4 is a diagram showing an example of the manner in which a synchronization marker is added following the encrypted non-header part in the VOH-based encryption.

In FIG. 4, numerals 410 to 450 designate an example of the VOH-based encryption by the method in which the synchronization marker is attached after the encrypted non-header part (including "header of several bytes" and the VOP header in this case). In this example, the synchronization marker has four bytes.

In this example, the VOH (indicating "video_object_start_code" in this case) is used as a code for location identification while regarding the. VOP header as a non-header part at the time of encryption or decryption.

In FIG. 4, numeral 410 designates a case of the video stream before encryption by the device at transmitting end.

In FIG. 4, numeral 420 designates an example of an encrypted stream generated by encrypting the non-header part (including "header of several bytes" and VOP header in this case) by the device at transmitting end.

In FIG. 4, numeral 430 designates an example of the encrypted stream with the four-byte synchronization marker (indicated as "(XX XX XX XX)h" in FIG. 4) added after the encrypted data by the device at transmitting end.

In FIG. 4, numeral 440 designates an example in which 8 bytes including the synchronization marker and the VOH are detected from the encrypted stream and the preceding encrypted data is decrypted and inserted in the original stream by the device at receiving end.

In FIG. 4, numeral 450 designates an example in which the synchronization marker is deleted from the encrypted stream and the data following the deleted synchronization marker is moved forward by the device at receiving end.

An example of the operation of the device at transmitting end is explained below.

In the device at transmitting end, the four-byte VOH is detected from the video stream designated by 410 in FIG. 4, and then the four-byte VOP (indicating "vop_start_code" in this case) is detected. Upon detection of the next four-byte VOH, as indicated by 420 in FIG. 4, the data involved therebetween, i.e. the data ranging from the first VOP data to the last VOP data are encrypted with the cryptographic key. In this case, "header of several bytes" following the first VOP is also encrypted. Next, as indicated by 430 in FIG. 4, the synchronization marker is attached after the encrypted non-header part (in this case, the portion ranging from the first VOP data to the last VOP data including the "header of several bytes" following the first VOP and other VOP headers) and the resulting data stream is output to the network 2.

An example of the operation of the device at receiving end is explained below.

In the device at receiving end, the four-byte VOH is detected from the encrypted stream, and then the four-byte VOP is detected. Next, upon detection of a total of 8 bytes (synchronization marker+VOH), as indicated by 440 in FIG. 4, the data between the detected VOP and the neighboring "synchronization marker+VOH" is decrypted with the cryptographic key. As indicated by 450 in FIG. 4, the four-byte synchronization marker is deleted, and the following stream is moved forward. After that, a similar operation is performed repeatedly for all the encrypted data.

As described above, by attaching the synchronization marker after the encrypted non-header part (including "header of several bytes" and the VOP header in this case) at the time of encryption of the non-header part (including "header of several bytes" and the VOP header in this case) of the video stream, the probability of erroneously detecting the dummy code contained in the encrypted stream as a valid start code is reduced.

In this example, the configuration is shown in which the synchronization marker is inserted after the encrypted non-header part (including "header of several bytes" and the VOP header in this case) (before the VOH). Nevertheless, the location at which the synchronization marker is inserted is not limited to this configuration. For example, a configuration in which the synchronization marker is inserted before the encrypted non-header part (including "header of several bytes" and the VOP header in this case) (or after the VOH, for example) can produce a similar effect to this example.

EXAMPLE 1-3

Figure 5:
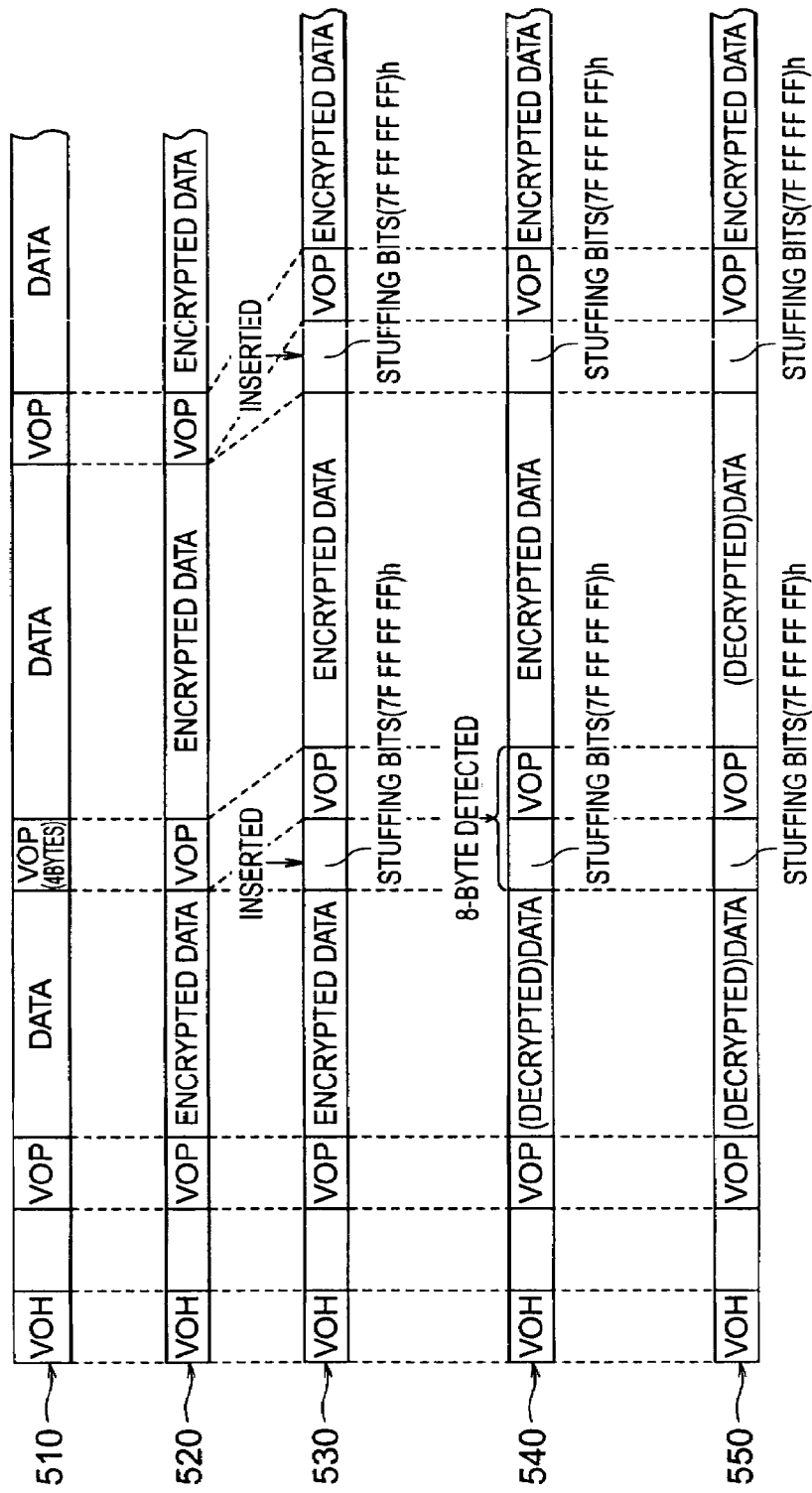
FIG. 5 is a diagram showing an example of the manner in which a stuffing bit is added as a synchronization marker following the encrypted non-header part in the VOP-based encryption.

In FIG. 5, numerals 510 to 550 designate the VOP-based encryption by the method of attaching at least a stuffing bit as a synchronization marker after the encrypted non-header part. In this case, the stuffing bit is formed of four bytes.

In this example, the VOP (indicating "vop_start_code" in this case) is used as a code for location identification at the time of encryption and decryption.

In this case, the stuffing bits are inserted in the video stream for byte alignment (setting the position of the head of the data to the head of the byte (=8 bits)) in MPEG-4 scheme. In other words, in the case where the length of the video stream is equal to multiple of a byte unit, the stuffing bit is added after the video stream.

The pattern of the stuffing bits is determined to define the length thereof, and the stuffing bits are ignored when the video stream is expanded by the decoder 15.

Specifically, the stuffing bits have a pattern in the form of 0, 01, 011, 0111, . . . , 01111111, . . . , of each dividing point can be detected by finding "0" when decrypted in the reverse direction,. In the case where the video stream with the stuffing bits added thereto is expanded, therefore, the stuffing bits are ignored.

The use of the stuffing bits having this feature as a synchronization marker eliminates the process of deleting the synchronization marker and advancing the following data forward in the device at receiving end, thereby making a high-speed decryption process possible.

In FIG. 5, numeral 510 designates an example of the video stream before encryption by the device at transmitting end.

In FIG. 5, numeral 520 designates an example of the encrypted stream generated by encrypting the non-header part by the device at transmitting end. In this case, "header of several bytes" following VOP is also encrypted.

In FIG. 5, numeral 530 designates an example of the encrypted stream into which the four-byte stuffing bits (indicated as "(7F FF FF FF)h" in FIG. 5) are inserted as a synchronization marker after the encrypted data by the device at transmitting end.

In FIG. 5, numeral 540 designates an example in which 8 bytes including the synchronization marker and VOP are detected from the encrypted stream by the device at receiving end, and the preceding encrypted data is decrypted and inserted into the original stream.

In FIG. 5, numeral 550 designates an example of the manner in which the encrypted data in the encrypted stream are sequentially decrypted similarly by the device at receiving end.

An example of the operation of the device at transmitting end is explained below.

In the device at transmitting end, the four-byte VOH (indicating "video_object_start_code" in this example) and then the four-byte VOP are detected from the video stream designated by 510 of FIG. 5. Upon detection of the next four-byte VOP, as indicated by 520 in FIG. 5, the data between the detected neighboring two VOPs (i.e. "header of several bytes" following the VOP and the VOP data) is encrypted with the cryptographic key. Next, as indicated by 530 in FIG. 5, the synchronization marker (the stuffing bits in this case) is added after the encrypted non-header part (the encrypted "header of several bytes" and VOP data in this case) and the resulting data stream is output to the network 2.

An example of the operation of the device at receiving end is explained below.

In the device at receiving end, the four-byte VOH and then the four-byte VOP are detected from the encrypted stream. Upon detection of the next 8 bytes in total (synchronization marker+VOP), as indicated by 540 in FIG. 5, the data between the detected VOP and the neighboring "synchronization marker+VOP" is decrypted with the cryptographic key. After that, as indicated by 550 in FIG. 5, a similar operation is repeated for all the encrypted data.

In this way, the non-header part of the video stream is encrypted while adding the stuffing bits as a synchronization marker after the encrypted non-header part, with the result that the probability of erroneously detecting the dummy code contained in the encrypted stream as a valid start code can be reduced and the high-speed decryption process is realized.

In this example, the function of the stuffing bits originally belonging to the devices at transmitting and receiving ends is utilized by inserting the stuffing bits as a synchronization marker at a position after the encrypted non-header part (before VOP).

EXAMPLE 1-4

Figure 6:
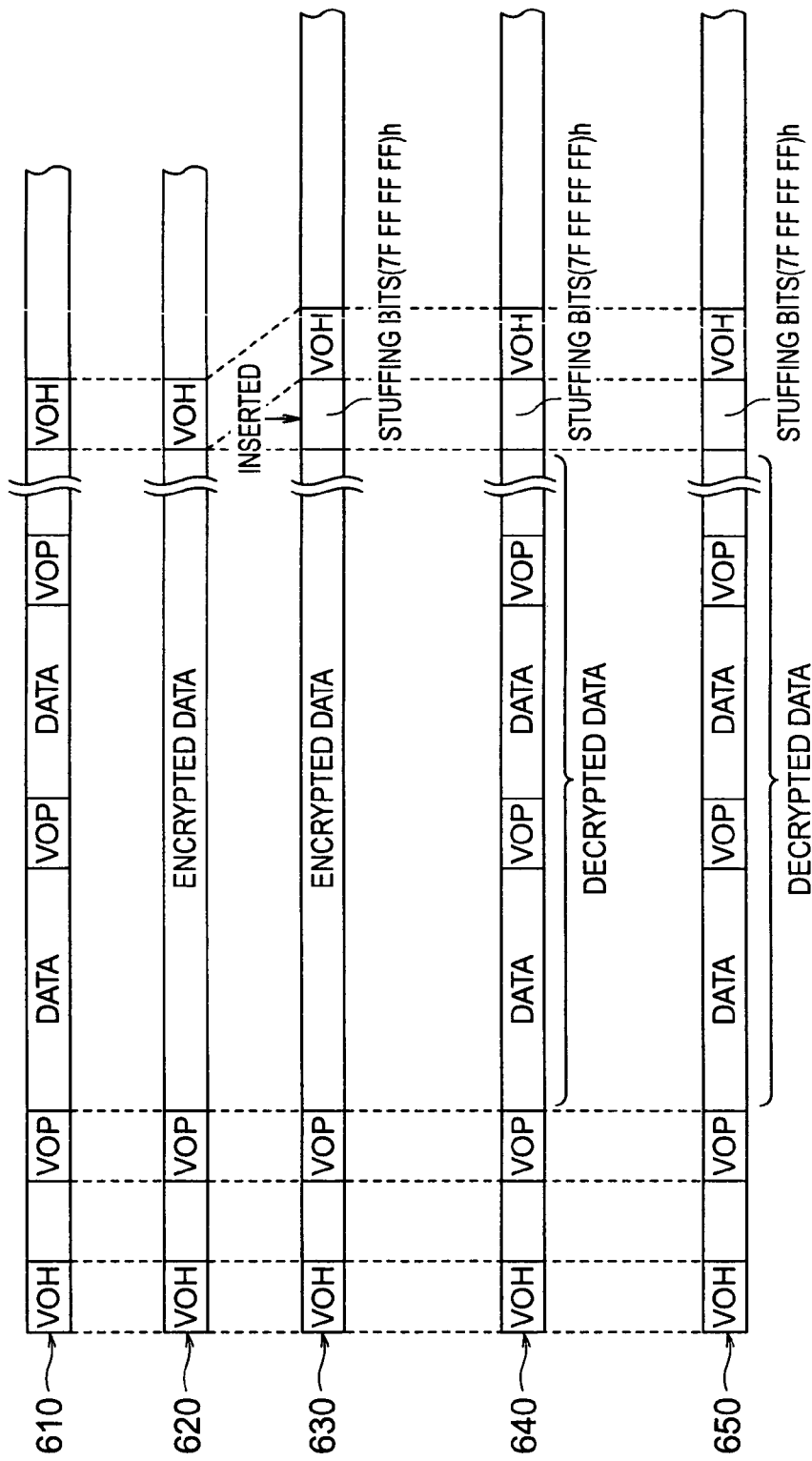
FIG. 6 is a diagram showing an example of the manner in which a stuffing bit is added as a synchronization marker following the encrypted non-header part in the VOH-based encryption.

In FIG. 6, numerals 610 to 650 designate the VOH-based encryption by the method in which the stuffing bits are attached as a synchronization marker after the encrypted non-header part (including "header of several bytes" and VOP header in this case). In this example, the stuffing bits are formed of four bytes.

In this example, the VOH (indicating "video_object_start_code" in this case) is used as a code for location identification and the VOP header is regarded as a non-header part at the time of encryption or decryption.

In FIG. 6, numeral 610 designates an example of the video stream before encryption by the device at transmitting end.

In FIG. 6, numeral 620 designates an example of the encrypted stream generated by encrypting the non-header part (including "header of several bytes" and VOP header in this case) by the device at transmitting end.

In FIG. 6, numeral 630 designates an example of the encrypted stream in which the four-byte stuffing bits (indicated as "(7F FF FF FF)h" in FIG. 6) are inserted as a synchronization marker after the encrypted data by the device at transmitting end.

In FIG. 6, numeral 640 designates an example in which 8 bytes including the synchronization marker and VOH are detected from the encrypted stream and the preceding encrypted data is decrypted and inserted in the original stream by the device at receiving end.

In FIG. 6, numeral 650 designates an example in which the encrypted data in the encrypted stream are sequentially decrypted in similar manner by the device at receiving end.

An example the operation of the device at transmitting end is explained below.

In the device at transmitting end, the four-byte VOH and then the four-byte VOP (indicating "vop_start_code" in this example) are detected from the video stream designated by 610 of FIG. 6. Upon detection of the next four-byte VOH, as indicated by 620 in FIG. 6, the data involved, i.e. the data ranging from the first VOP data to the last VOP data is encrypted with the cryptographic key. In this example, "header of several bytes" following the first VOP is also encrypted. Next, as indicated by 630 in FIG. 6, the stuffing bits are added as a synchronization marker after the encrypted non-header part (the portion ranging from the first VOP data to the last VOP data and including "header of several bytes" following the first VOP and other VOP headers) and the resulting data stream is output to the network 2.

An example of the operation of the device at receiving end is explained below.

In the device at receiving end, the four-byte VOH and then the four-byte VOP are detected from the encrypted stream. Next, upon detection of 8 bytes in total (synchronization marker+VOH), as indicated by 640 in FIG. 6, the data between the detected VOP and the neighboring "synchronization marker+VOH" is decrypted with the cryptographic key. After that, as indicated by 650 in FIG. 6, a similar operation is repeated for all the encrypted data.

In this way, the non-header part (including "header of several bytes" and VOP header in this example) of the video stream is encrypted while adding the stuffing bits as a synchronization marker after the encrypted non-header part (including "header of several bytes" and VOP header in this case), so that the probability of erroneously detecting the dummy code contained in the encrypted stream as a valid start code can be reduced, while at the same time realizing the high-speed decryption process.

In this example, the function of the stuffing bits originally belonging to the devices at transmitting and receiving ends is utilized by inserting the stuffing bits as a synchronization marker at a position after the encrypted non-header part (including "header of several bytes" and VOP header in this case) (or before VOH).

As shown in each of the examples described above, the encrypted data communication system according to this embodiment is so configured that the non-header part (which includes "header of several bytes" and may include the VOP header in this embodiment) of the video stream is encrypted by the device at the transmitting by adding a synchronization marker after or before the encrypted non-header part (which includes "header of several bytes" and may include the VOP header in this embodiment).

As a result, the header length is expanded substantially from four bytes to eight bytes, so that the probability of detecting the dummy code in the non-header part (which includes "header of several bytes" and may include the VOP header in this embodiment) is reduced. Incidentally, the data of the non-header part is, for example, the variable-length video encoding data.

Also, in the device at receiving end of the encrypted data communication system according to this embodiment, the portion representing each combination of the synchronization marker and the start code is detected from the encrypted video stream (encrypted stream), and the encrypted non-header part (which includes "header of several bytes" and may include the VOP header in this embodiment) is decrypted as explained above.

Also, in the device at receiving end of the encrypted data communication system according to this embodiment, the portion representing each combination of the synchronization marker and the start code is detected from the encrypted video stream (encrypted stream), and the encrypted non-header part (which includes "header of several bytes" and may include the VOP header in this embodiment) is decrypted, after which the synchronization marker is deleted and the following portion is moved forward.

As an alternative, in the device at receiving end of the encrypted data communication system according to this embodiment, in the case where the synchronization marker is not required to be deleted, the synchronization marker is left in the video stream at the time of decrypting the encrypted non-header part (which includes "header of several bytes" and may include the VOP header in this embodiment) as described above.

In the device at transmitting end of the encrypted data communication system according to this embodiment, for example, the stuffing bits are attached as a synchronization marker after the encrypted non-header part (which includes "header of several bytes" and may include the VOP header in this embodiment). In other words, the data is inserted in the stuffing bit area and utilized as a synchronization marker.

In the case where the stuffing bits are used in this manner, the particular stuffing bits making up the synchronization marker are left in the video stream at the time of decrypting the encrypted non-header part (which includes "header of several bytes" and may include the VOP header in this embodiment) by the device at receiving end.

In the encrypted communication system according to this embodiment, therefore, the header length is substantially lengthened by providing a synchronization marker as described above, resulting in a lower probability that the same value (dummy code) as the start code portion (a combination of the synchronization marker and the VOP or VOH in this embodiment) appears in the non-header part (which includes "header of several bytes" and may include the VOP header in this embodiment) of the encrypted stream.

As a result, in the case where the encrypted stream is decrypted by the personal computer at receiving end, for example, the probability of erroneously detecting the dummy code contained in the encrypted stream as a valid start code is reduced and the accuracy of image reproduction can be improved Embodiment 2

A second embodiment of the invention is explained below.

EXAMPLE 2-1

Figure 7:
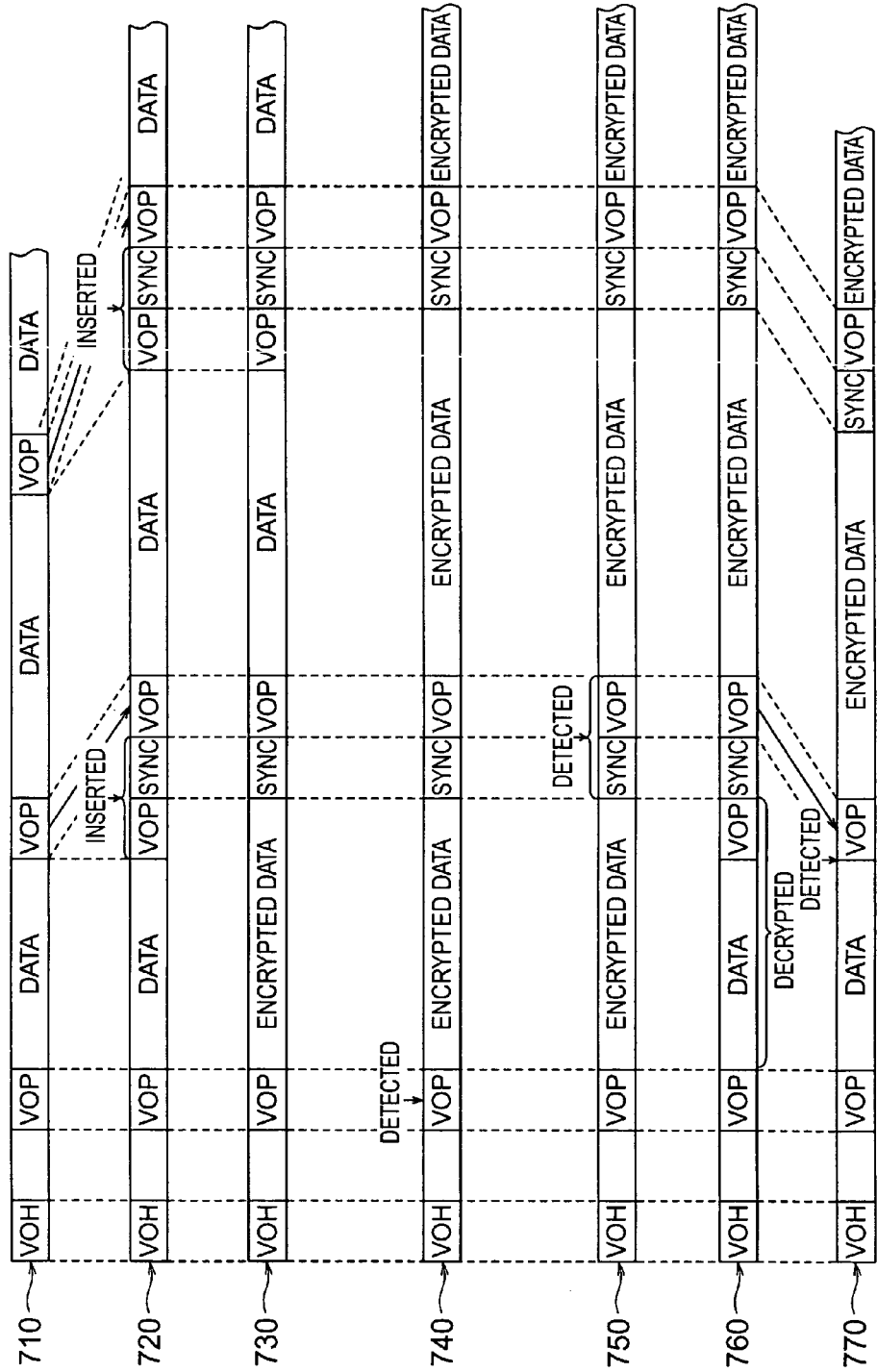
FIG. 7 is a diagram showing an example of the manner in which, after a start code and a synchronization marker are added following a non-header part, a non-header part and the start code are encrypted in the VOP-based encryption.

Numerals 710 to 770 in FIG. 7 and numerals 810 to 850 designate an example of the VOP-based encryption conducted by the method in which "non-header part+start code" is encrypted by adding "start code+synchronization marker" after the non-header part. The synchronization marker has, for example, four bytes.

Although this example represents an example in which the VOP (indicating "vop_start_code" in this case) is added as the start code in the "start code+synchronization marker" after the non-header part, other patterns may be used with similar effect. In MPEG-4 scheme, for example, it is possible to use a unique code configured of a bit pattern of which the appearance in the non-header part is prohibited, such as VOH (indicating "video_object_start_code" in this case), the start code ("(00 00 01 02)h") of the VOL (Video Object Layer) header, "User data start code ("(00 00 01 B2)h") or the start code ("(00 00 01 B3)h") of the GOV (Group Of Video) header.

First, with reference to 710 to 770 in FIG. 7, an explanation is given about a case in which "synchronization marker+VOP" is validly detected from the encrypted stream by the device at receiving end.

In FIG. 7, numeral 710 designates an example of the video stream before encryption by the device at transmitting end.

In FIG. 7, numeral 720 designates an example of the video stream in which the VOP and the synchronization marker (SYNC) are inserted after the VOP data by the device at transmitting end.

In FIG. 7, numeral 730 designates an example in which the data (non-encrypted data) and the VOP are encrypted by the device at transmitting end. In this encrypted stream, the data and the following VOP portion are encrypted to form the encrypted data. In this example, "header of several bytes" following the VOP located on the left side is also encrypted.

In FIG. 7, numeral 740 designates an example of the manner in which the VOP is detected from the encrypted stream by the device at receiving end.

In FIG. 7, numeral 750 designates an example of the manner in which a combination of the synchronization marker and the VOP is detected by the device at receiving end.

In FIG. 7, numeral 760 designates an example in which the data between the VOP and a combination of the synchronization marker and the VOP is decrypted by the device at receiving end.

In FIG. 7, numeral 770 designates an example in which the VOP and the synchronization marker after the VOP data are deleted by the device at receiving end.

An example of the operation of the device at transmitting end is explained below.

In the device at transmitting end, the four-byte VOH and then the four-byte VOP are detected from the video stream designated by 710 of FIG. 7. Upon detection of the next four-byte VOP, as indicated by 720 in FIG. 7, "VOP+synchronization marker" is inserted after the data involved, i.e. the VOP data, and as indicated by 730 in FIG. 7, the portion of "VOP data+VOP" is encrypted with the cryptographic key. The encrypted stream thus obtained is output to the network 2.

An example of the operation of the device at receiving end is explained below.

In the device at receiving end, the four-byte VOH and then the four-byte VOP are detected from the encrypted stream, as indicated by 740 in FIG. 7,. Next, upon detection of 8 bytes in total as "synchronization marker+VOP", as indicated by 750 in FIG. 7, the data between the detected VOP and the neighboring "synchronization marker+VOP" is decrypted with the cryptographic key as indicated by 760 in FIG. 7.

It is determined whether the start code (VOP in this case) appears or not at the end of the decrypted data.

The bit sequence coincident with the start code (VOP in this case) fails to appear in the non-header part ("header of several bytes" and VOP data in this case), and therefore, in the case where the start code appears at the end of the decrypted data, the particular start code is determined as the aforementioned start code in the "start code+synchronization marker" inserted after the non-header part in the device at transmitting end. Specifically, the "synchronization marker+start code" detected earlier is not the dummy code in the encrypted data but can be confirmed as a valid "synchronization marker+start code".

In the device at receiving end, as indicated by 770 in FIG. 7, the "VOP+synchronization marker" after the VOP data is deleted, and the following stream is moved forward. After that, a similar operation is repeated.

By adding the "start code+synchronization marker" after the non-header part and encrypting "non-header part+start code" as described above, the erroneous detection of the dummy code contained in the encrypted stream as a valid start code is prevented.

With this configuration for detecting a total of 8 bytes of "synchronization marker+VOP" in the device at receiving end as described above, the probability of erroneously detecting the dummy code in the encrypted stream is as low as about once every 2.3 million years for the coding rate of, say, 2 Mbps. Specifically, in the case where the coding rate is 2 Mbps, the interval of erroneous dummy code detection is given as $2^{8 \times 8}$ (bits)/{2 M(bits/sec)/8}=($2^{64}$/250000) (sec) ≈2339769 (years)≈2.3 million years. Thus, the eight-byte dummy code appears in the encrypted stream about once for every 2.3 million years.

Figure 8:
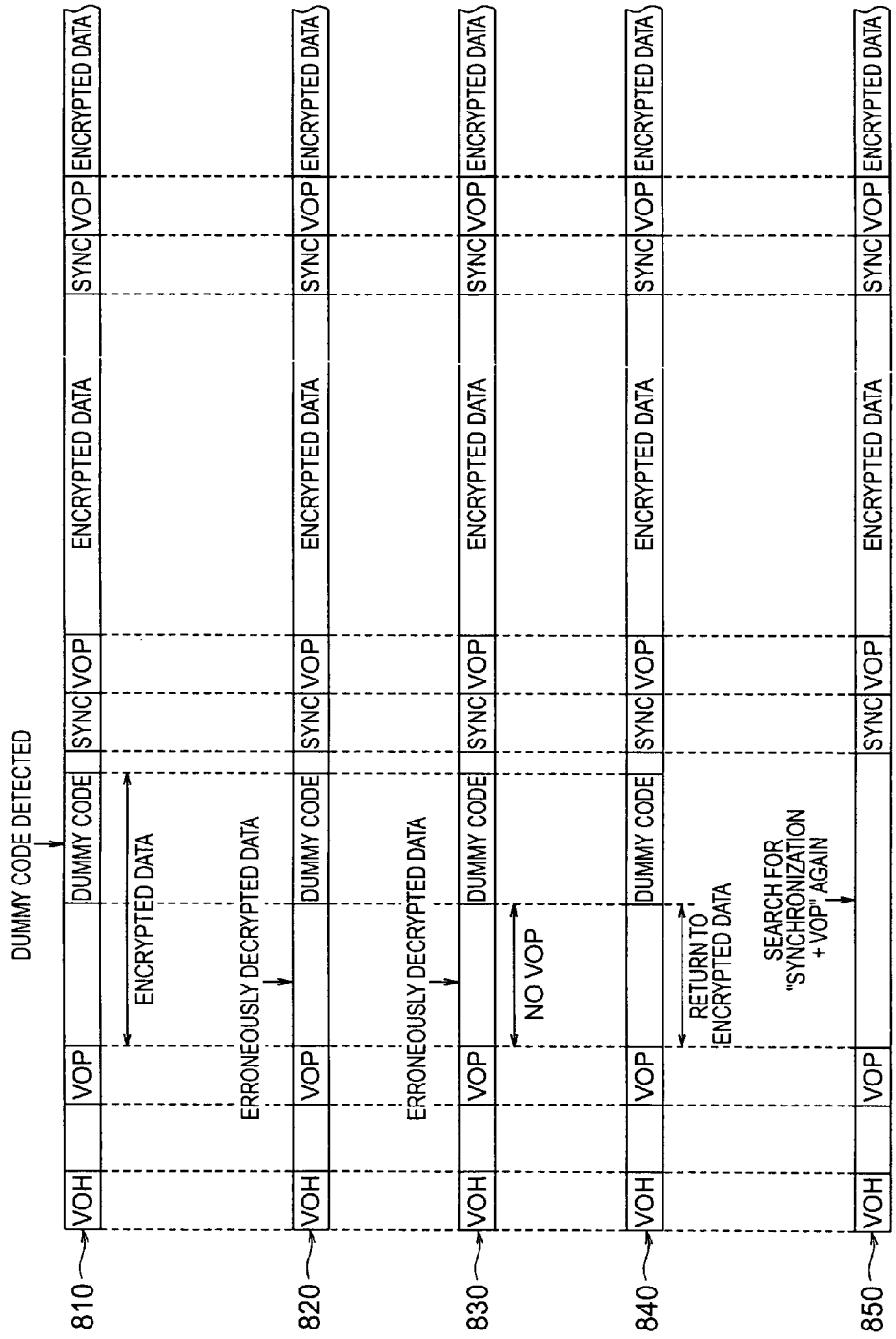
FIG. 8 is a diagram showing an example of the manner in which a dummy code is erroneously detected from the encrypted data.

Next, with reference to 810 to 850 in FIG. 8, an explanation is given about a case in which a dummy code is erroneously detected from the encrypted data by the device at receiving end.

In FIG. 8, numeral 810 designates an example of the manner in which the dummy code in the encrypted data is detected by the device at receiving end.

In FIG. 8, numeral 820 designates an example of the manner in which the data is erroneously generated in view of the fact that the data between VOP and the dummy code is decrypted by the device at receiving end. In this example, only a part of the encrypted data is erroneously decrypted.

In FIG. 8, numeral 830 designates an example of the manner in which the appearance of the dummy code is detected by the device at receiving end. Specifically, in the absence of the start code (VOP in this case) in the non-header part, no start code (VOP in this case) appears at the end of the data erroneously decrypted, and therefore the erroneous detection of the dummy code in the encrypted data is determined.

In FIG. 8, numeral 840 designates an example of the manner in which the data erroneously decrypted by the device at receiving end is returned to the original encrypted data.

In FIG. 8, numeral 850 designates an example of the manner in which the encrypted data is searched for a combination of the synchronization marker and VOP again by the device at receiving end.

An example of the operation by the device at receiving end is explained below.

In the device at receiving end, as in the aforementioned case, the encrypted stream is searched for "synchronization marker+VOP", and as indicated by 810 in FIG. 8, the dummy code of the same value is detected. In this case, as indicated by 820 in FIG. 8, the data between VOP and the dummy code is decrypted with the cryptographic key.

In the process, it is determined whether the VOP appears or not at the end of the decrypted data. The bit sequence coincident with the VOP fails to appear in the non-header part ("header of several bytes" and "VOP data" in this case). In the case where the VOP appears at the end of the decrypted data, therefore, the "synchronization marker+VOP" detected earlier is not the dummy code in the encrypted data but determined as a valid "synchronization marker+VOP".

In the case of this example, however, as indicated by 830 in FIG. 8, no VOP appears at the end of the decrypted data. Therefore, the erroneous detection of the dummy code in the encrypted data is determined.

In the case where the dummy code is erroneously detected as in this example, the encrypted data before decryption contained temporarily in a memory, for example, is inserted into the original position so that, as indicated by 840 in FIG. 8, the erroneously decrypted data is returned to the original encrypted data by the device at receiving end. Then, as indicated by 850 in FIG. 8, the data including and subsequent to the dummy code detected erroneously are searched for a total of 8 bytes of "synchronization marker+VOP".

As described above, in this example, "VOP data+VOP" is encrypted by inserting "VOP+synchronization marker" after the VOP data by the device at transmitting end, while the device at receiving end decrypts the encrypted data and confirms whether VOP appears or not at the end of the decrypted data. As a result, even in the case where the dummy code appears, the situation in which the encrypted data cannot be validly decrypted is avoided.

Although the case in which a marker for determination exists at the end of the decrypted data is explained in this example, the marker for determination may be inserted at an arbitrary position, as long as the device at receiving end can determine where the marker for determination is inserted.

EXAMPLE 2-2

Figure 9:
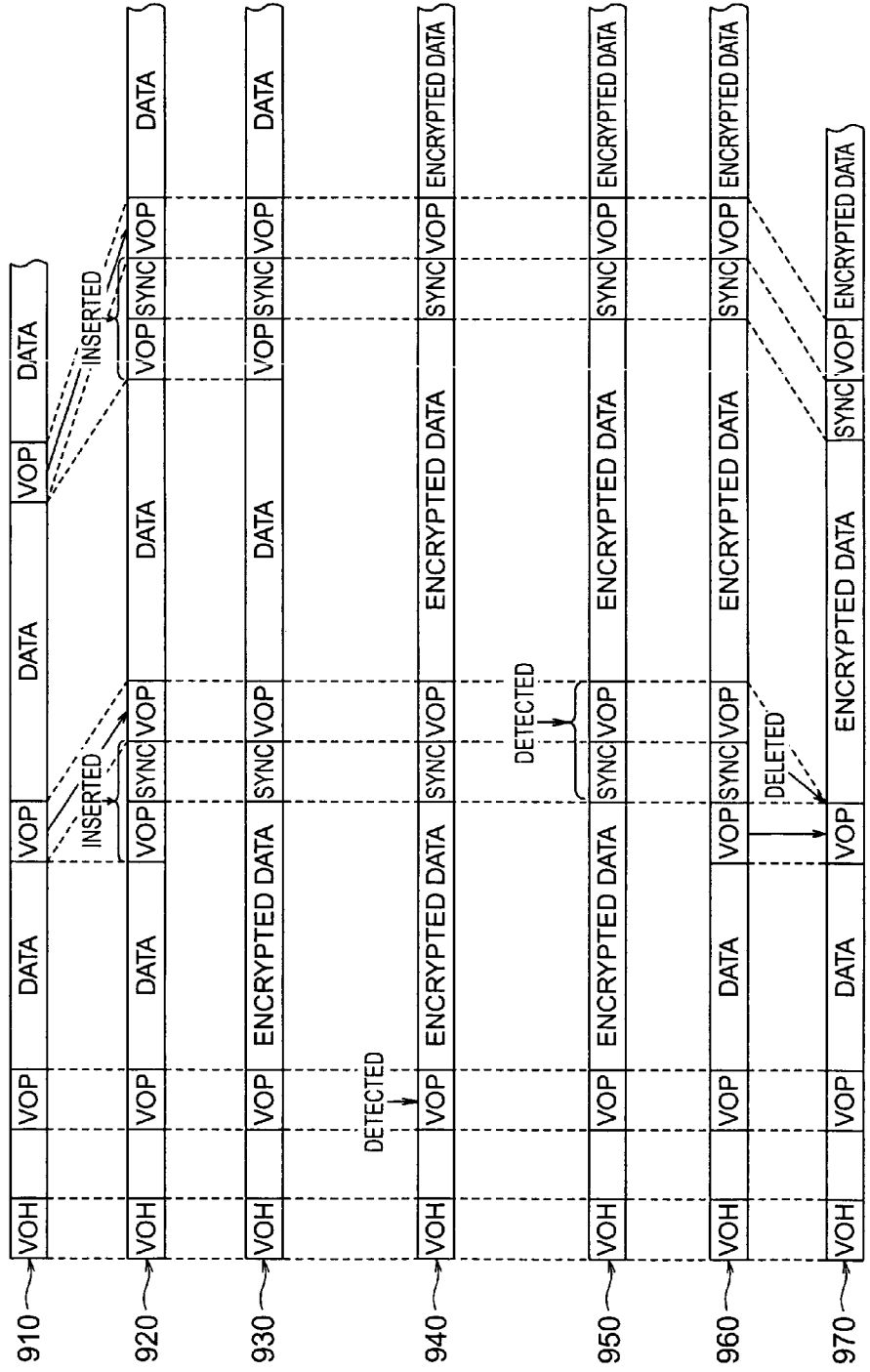
FIG. 9 is a diagram showing another example of the manner in which, after a start code and a synchronization marker are added following a non-header part, a non-header part and the start code are encrypted in the VOP-based encryption.

In FIG. 9, numerals 910 to 970 indicate an example of the VOP-based encryption by a method in which "non-header part+start code" is encrypted by adding "start code+synchronization marker" after the non-header part. The synchronization marker has four bytes.

According to this example, the "synchronization marker+VOP" after the VOP (indicating "vop_start_code" in this case) in the received stream is deleted by the device at receiving end, and therefore VOP is used as the start code in "start code+synchronization marker" added after the non-header part in the transmitted stream by the device at transmitting end.

An explanation is given below about a case in which the device at receiving end validly detects "synchronization marker+VOP" from the encrypted stream.

In FIG. 9, numeral 910 indicates an example of the video stream before encryption by the device at transmitting end.

In FIG. 9, numeral 920 indicates an example of the video stream in which VOP and the synchronization marker (SYNC) are inserted after the VOP data by the device at transmitting end.

In FIG. 9, numeral 930 indicates an example of the manner in which the data (non-encrypted data) and VOP are encrypted by the device at transmitting end. In this encrypted stream, the data and the following VOP portion are encrypted to form the encrypted data. In this example, "header of several bytes" following the VOP located on the left side is also encrypted.

In FIG. 9, numeral 940 indicates an example of the manner in which VOP is detected from the encrypted stream by the device at receiving end.

In FIG. 9, numeral 950 indicates an example of the manner in which a combination of the synchronization marker and VOP is detected by the device at receiving end.

In FIG. 9, numeral 960 indicates an example of the manner in which the data between VOP and a combination of the synchronization marker and VOP is decrypted by the device at receiving end.

In FIG. 9, numeral 970 indicates an example of the manner in which the synchronization marker and VOP after VOP are deleted by the device at receiving end.

An example of the operation of the device at transmitting end is explained below.

In the device at transmitting end, the four-byte VOH (indicating "video_object_start_code" in this case) and then the four-byte VOP are detected from the video stream shown by 910 in FIG. 9. Upon detection of the next four-byte VOP, as indicated by 920 in FIG. 9, "VOP+synchronization marker" is inserted after the data involved, i.e. the VOP data, and as indicated by 930 in FIG. 9, the portion "VOP data+VOP" is encrypted with a cryptographic key. The encrypted stream thus obtained is output to the network 2.

An example of the operation by the device at receiving end is explained.

In the device at receiving end, the four-byte VOH and then the four-byte VOP are detected from the encrypted stream as indicated by 940 in FIG. 9. As indicated by 950 in FIG. 9, "synchronization marker+VOP" of eight bytes in total is detected, so that as indicated by 960 in FIG. 9, the data between the detected VOP and the neighboring "synchronization marker+VOP" is decrypted with the cryptographic key.

In the process, it is determined whether the start code (VOP in this case) appears or not at the end of the decrypted data.

The bit sequence coincident with the start code (VOP in this case) fails to appear in the non-header part ("header of several bytes" and the VOP data in this case). In the case where the start code appears at the end of the decrypted data, therefore, it is determined that the particular start code is the one included in "start code+synchronization marker" inserted after the non-header part by the device at transmitting end. Specifically, it is determined that the "synchronization marker+start code" detected earlier is not the dummy code in the encrypted data but a valid "synchronization marker+start code".

In the device at receiving end, as indicated by 970 in FIG. 9, "synchronization marker+VOP" after VOP is deleted and the following stream is moved forward. After that, a similar operation is repeated.

In the case where a dummy code is erroneously detected from the encrypted data by the device at receiving end, a similar process to the one explained with reference to 810 to 850 in FIG. 8 is executed.

In the case where the VOH appears in the second or subsequent session, a process different from the aforementioned one is executed. Specifically, "VOP+synchronization marker" is inserted before VOH as indicated by 920 in FIG. 9, "synchronization marker+VOH" is detected as indicated by 950 in FIG. 9, and "VOP+synchronization marker" after the VOP data is deleted as indicated by 970 in FIG. 9.

In this way, by attaching "start code+synchronization marker" after the non-header part and encrypting "non-header part+start code", the dummy code contained in the encrypted stream is prevented from being erroneously detected as a valid start code.

EXAMPLE 2-3

Figure 10:
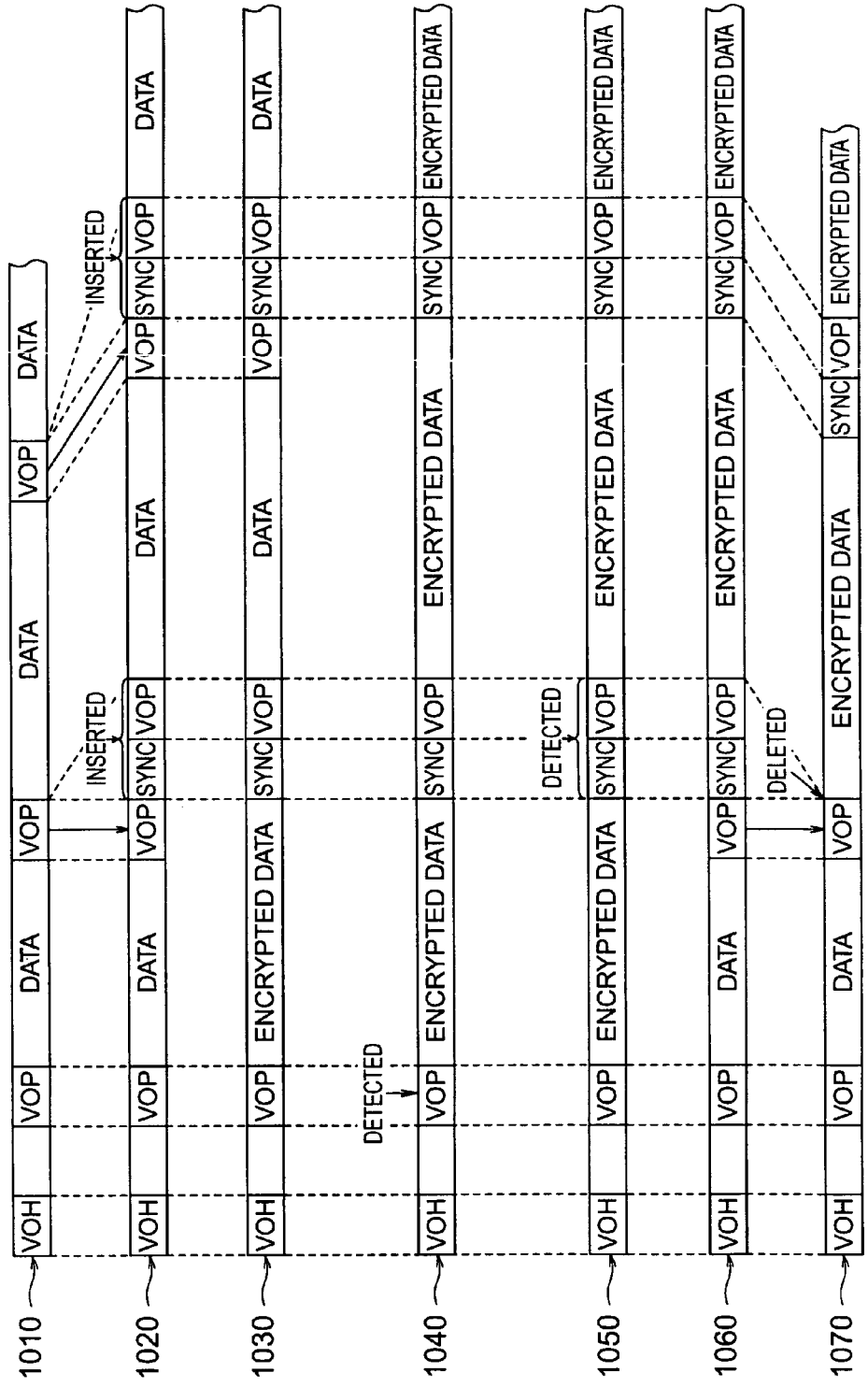
FIG. 10 is a diagram showing an example of the manner in which, after a synchronization marker and a start code are added following an another start code, a non-header part and the one start code are encrypted in the VOP-based encryption.

Numerals 1010 to 1070 in FIG. 10 designate an example of the VOP-based encryption by a method in which the "non-header part+start code" is encrypted by adding "synchronization marker+start code" after the start code. The synchronization marker has, for example, four bytes.

Although this example represents a case in which the VOP (indicating "vop_start_code" in this case) is used as a start code, other header start codes may be used as another example such as VOH (indicating "video_object_start_code" in this case), the start code of the VOL header, "User data start code" or the start code of the GOV header.

In this example, "synchronization marker", "vop_start_code" are inserted in the bit sequence of "vop_start_code", "header of several bytes", "VOP data" thereby to generate the bit sequence "vop_start_code", "synchronization marker", "vop_start_code", "header of several bytes", "VOP data". As another example, it is also possible to generate the bit sequence "vop_start_code", "header of several bytes", "synchronization marker", "vop_start_code", "VOP data".

An explanation is given below about a case in which the device at receiving end validly detects "synchronization marker+VOP" from the encrypted stream.

In FIG. 10, numeral 1010 indicates an example of the video stream before encryption by the device at transmitting end.

In FIG. 10, numeral 1020 indicates an example of the video stream with a synchronization marker (SYNC) and VOP inserted after the VOP by the device at transmitting end.

In FIG. 10, numeral 1030 indicates an example of the manner in which the data (non-encrypted data) and the VOP are encrypted by the device at transmitting end. In this encrypted stream, the data and the following VOP portion are encrypted to form the encrypted data. In this example, "header of several bytes" following the VOP located on the left side is also encrypted.

In FIG. 10, numeral 1040 indicates an example of the manner in which the VOP is detected from the encrypted stream by the device at receiving end.

In FIG. 10, numeral 1050 indicates an example of the manner in which a combination of the synchronization marker and the VOP is detected by the device at receiving end.

In FIG. 10, numeral 1060 indicates an example of the manner in which the data between the VOP and the combination of the synchronization marker and the VOP is decrypted by the device at receiving end.

In FIG. 10, numeral 1070 indicates an example of the manner in which the synchronization marker and the VOP after the VOP are deleted by the device at receiving end.

An example of the operation of the device at transmitting end is explained below.

In the device at transmitting end, the four-byte VOH and then the four-byte VOP are detected from the video stream shown by 1010 in FIG. 10. Upon detection of the next four-byte VOP, as indicated by 1020 in FIG. 10, "synchronization marker+VOP" is inserted after the VOP, and as indicated by 1030 in FIG. 10, the portion "VOP data+VOP" is encrypted with a cryptographic key. The encrypted stream thus obtained is output to the network 2.

An example of the operation by the device at receiving end is explained.

In the device at receiving end, the four-byte VOH and the four-byte VOP are detected from the encrypted stream, as indicated by 1040 in FIG. 10, and as indicated by 1050 in FIG. 10, "synchronization marker+VOP" of eight bytes in total is detected, so that as indicated by 1060 in FIG. 10, the data between the detected VOP and the neighboring "synchronization marker+VOP" is decrypted with the cryptographic key.

In the process, it is determined whether the start code (VOP in this case) appears or not at the end of the decrypted data.

The bit sequence coincident with the start code (VOP in this case) fails to appear in the non-header part ("header of several bytes" and "VOP data" in this case). In the case where the start code appears at the end of the decrypted data, therefore, it is determined by the device at transmitting end that the particular start code is the one following the non-header part.

Specifically it is determined that the "synchronization marker+start code" detected earlier is not the dummy code in the encrypted data but a valid "synchronization marker+start code".

In the device at receiving end, as indicated by 1070 in FIG. 10, "synchronization marker+VOP" after the VOP is deleted and the following stream is moved forward. After that, a similar operation is repeated.

In the case where a dummy code is erroneously detected from the encrypted data by the device at receiving end, a similar process to that explained with reference to 810 to 850 in FIG. 8 is executed.

In the case where the VOH appears in the second or subsequent session, a process different from the aforementioned one is executed. Specifically, "synchronization marker+VOP" is inserted after VOH as indicated by 1020 in FIG. 10, "non-encrypted data+VOH" is encrypted as indicated by 1030 in FIG. 10, and "synchronization marker+VOP" after the VOH is deleted as indicated by 1070 in FIG. 10. Also, the device at receiving end checks whether the VOH appears at the end of the decrypted data at the time of decryption of the encrypted data.

In this way, by attaching "synchronization marker+start code" after the start code and encrypting "non-header part+start code", the dummy code contained in the encrypted stream is prevented from being erroneously detected as a valid start code.

Although this example represents a case in which "synchronization marker+start code" of 8 bytes is added, the synchronization marker of 8 bytes may alternatively be added to perform the normal operation.

EXAMPLE 2-4

Figure 11:
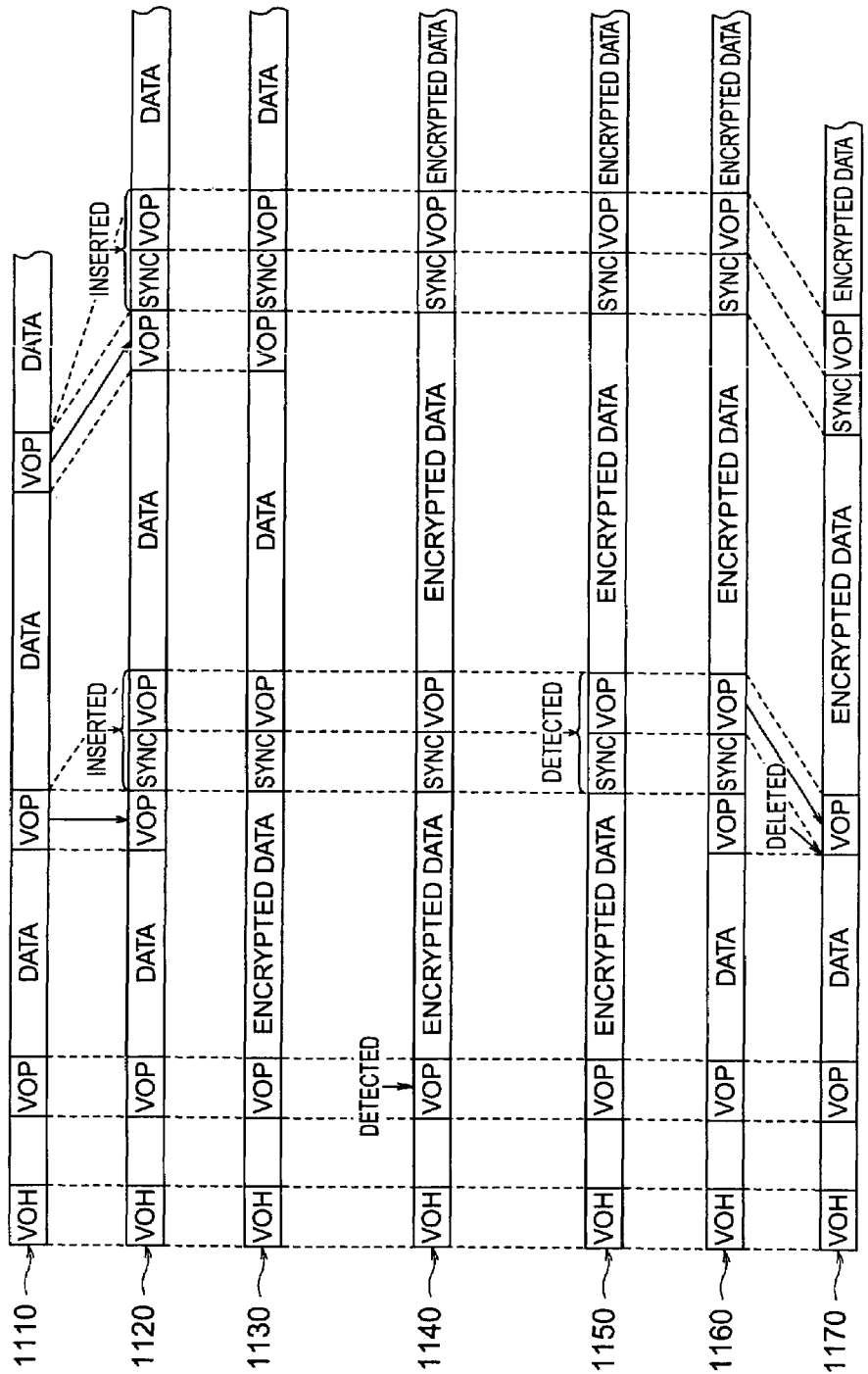
FIG. 11 is a diagram showing another example of the manner in which, after a synchronization marker and a start code are added following an another start code, a non-header part and the one start code are encrypted in the VOP-based encryption.

Numerals 1110 to 1170 in FIG. 11 designate an example of the VOP-based encryption executed by a method in which "non-header part+start code" is encrypted by adding "synchronization marker+start code" after the start code. The synchronization marker has, for example, four bytes.

In this example, "VOP+synchronization marker" after the VOP data in the received stream is deleted by the device at receiving end, and therefore the device at transmitting end uses the VOP (indicating "vop_start_code" in this case) as a start code of "synchronization marker+start code" added after the start code portion in the transmitted stream.

In this example, "synchronization marker", "vop_start_code" are inserted in the bit sequence of "vop_start_code", "header of several bytes", "VOP data" thereby to generate the bit sequence "vop_start_code", "synchronization marker", "vop_start_code", "header of several bytes", "VOP data".

An explanation is given below about a case in which the device at receiving end validly detects "synchronization marker+VOP" from the encrypted In FIG. 11, numeral 1110 indicates an example of the video stream before encryption by the device at transmitting end.

In FIG. 11, numeral 1120 indicates an example of the video stream with the synchronization marker (SYNC) and the VOP inserted after the VOP by the device at transmitting end.

In FIG. 11, numeral 1130 indicates an example of the manner in which the data (non-encrypted data) and the VOP are encrypted by the device at transmitting end. In this encrypted stream, the data and the following VOP portion are encrypted to form the encrypted data. In this example, "header of several bytes" following the VOP located on the left side is also encrypted.

In FIG. 11, numeral 1140 indicates an example of the manner in which the VOP is detected from the encrypted stream by the device at receiving end.

In FIG. 11, numeral 1150 indicates an example of the manner in which a combination of the synchronization marker and the VOP is detected by the device at receiving end.

In FIG. 11, numeral 1160 indicates an example of the manner in which the data between the VOP and the combination of the synchronization marker and the VOP is decrypted by the device at receiving end.

In FIG. 11, numeral 1170 indicates an example of the manner in which the VOP and the synchronization marker after the VOP data are deleted by the device at receiving end.

An example of the operation of the device at transmitting end is explained below.

In the device at transmitting end, the four-byte VOH (indicating "video_object_start_code" in this case) and then the four-byte VOP are detected from the video stream shown by 1110 in FIG. 11. Upon detection of the next four-byte VOP, as indicated by 1120 in FIG. 11, "synchronization marker+ VOP" is inserted after the VOP, and as indicated by 1130 in FIG. 11, the portion "VOP data+VOP" is encrypted with a cryptographic key. The encrypted stream thus obtained is output to the network 2.

An example of the operation by the device at receiving end is explained.

In the device at receiving end, the four-byte VOH and then the four-byte VOP are detected from the encrypted stream, as indicated by 1140 in FIG. 11. As indicated by 1150 in FIG. 11, "synchronization marker+VOP" of eight bytes in total is detected, so that as indicated by 1160 in FIG. 11, the data between the detected VOP and the neighboring "synchronization marker+VOP" is decrypted with the cryptographic key.

In the process, it is determined whether the start code (VOP in this case) appears or not at the end of the decrypted data.

The bit sequence coincident with the start code (VOP in this case) fails to appear in the non-header part ("header of several bytes" and the VOP data in this case). In the case where the start code appears at the end of the decrypted data, therefore, it is determined by the device at transmitting end that the particular start code is the one existing following the non-header part. Specifically, it is determined that the "synchronization marker+start code" detected earlier is not the dummy code but a valid "synchronization marker+start code" in the encrypted data.

In the device at receiving end, as indicated by 1170 in FIG. 11, "synchronization marker+VOP" after the VOP data is deleted and the following stream is moved forward. After that, a similar operation is repeated.

In the case where a dummy code is erroneously detected from the encrypted data by the device at receiving end, a similar process to that explained with reference to 810 to 850 in FIG. 8 is executed.

In the case where the VOH appears in the second or subsequent session, a process different from the aforementioned one is executed. Specifically, "synchronization marker+ VOH" is inserted after VOH as indicated by 1120 in FIG. 11, "non-encrypted data+VOH" is encrypted as indicated by 1130 in FIG. 11, "synchronization marker+VOH" is detected as indicated by 1150 in FIG. 11, and "VOH+synchronization marker" after the VOP data is deleted at 1170 in FIG. 11. Also, the device at receiving end checks whether the VOH appears at the end of the decrypted data at the time of decryption of the encrypted data.

In this way, by attaching "synchronization marker+start code" after the start code and encrypting "non-header part+ start code", the dummy code contained in the encrypted stream is prevented from being erroneously detected as a valid start code.

EXAMPLE 2-5

Figure 12:
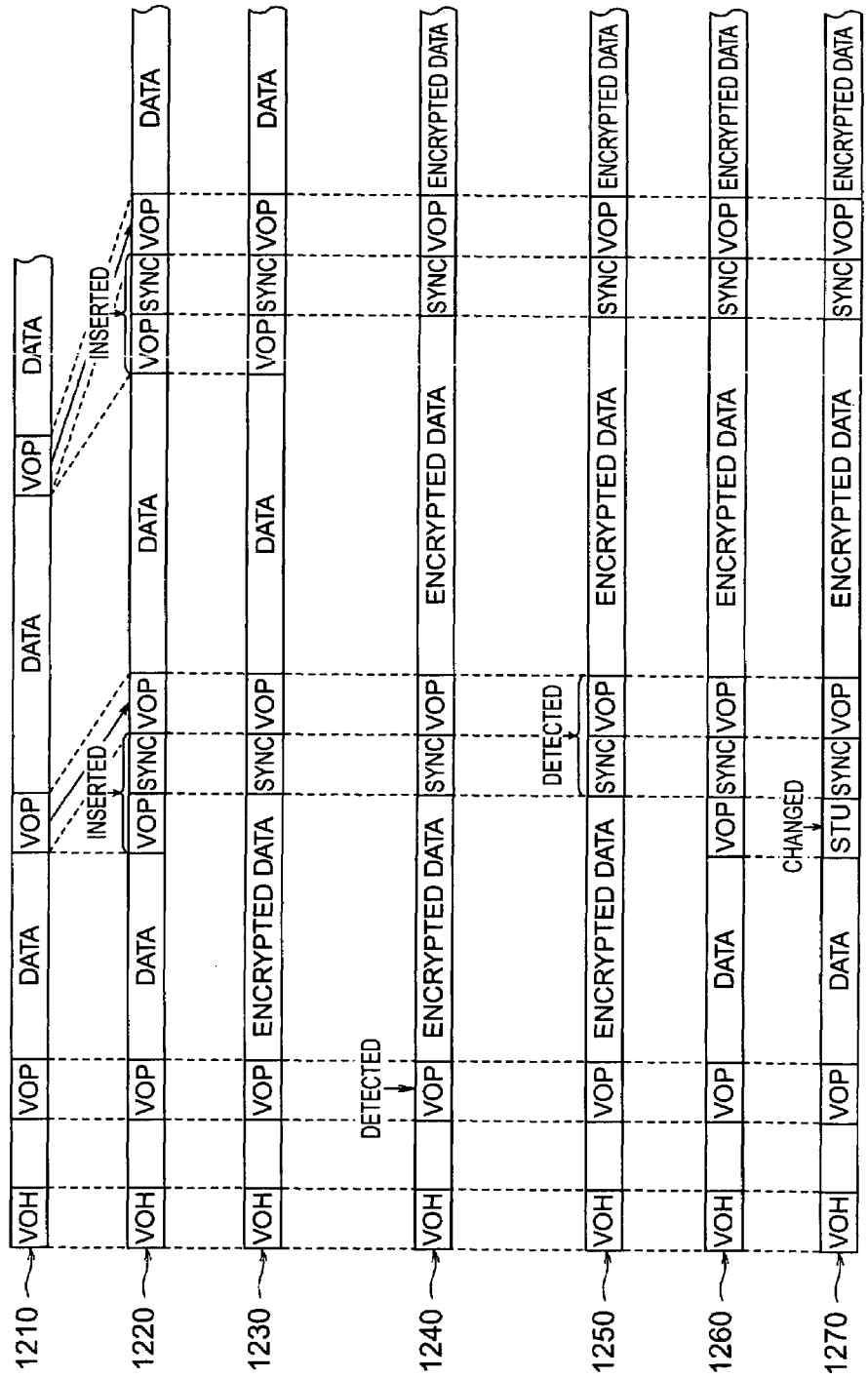
FIG. 12 is a diagram showing another example of the manner in which, after a start code and a synchronization marker are added following a non-header part, and the non-header part and the start code are encrypted in the VOP-based encryption.

Numerals 1210 to 1270 in FIG. 12 designate an example of the VOP-based encryption conducted by a method of encrypting "non-header part+start code" by adding "start code+synchronization marker" after the non-header part. The synchronization marker has, for example, four bytes.

In this example, VOP (indicating "vop_start_code" in this case) is used as a start code. As another example, however, the start codes of other headers including VOH (indicating "video_object_start_code" in this case), the start code of VOL header, "User data start code" or the start code of GOV header may be used.

An explanation is given below about a case in which the device at receiving end validly detects "synchronization marker+VOP" from the encrypted stream.

In FIG. 12, numeral 1210 indicates an example of the video stream before encryption by the device at transmitting end.

In FIG. 12, numeral 1220 indicates an example of the video stream with the VOP and the synchronization marker (SYNC) inserted after the VOP data by the device at transmitting end.

In FIG. 12, numeral 1230 indicates an example of the manner in which the data (non-encrypted data) and the VOP are encrypted by the device at transmitting end. In this encrypted stream, the data and the following VOP portion are encrypted to form the encrypted data. In this example, "header of several bytes" following the VOP located on the left side is also encrypted.

In FIG. 12, numeral 1240 indicates an example of the manner in which the VOP is detected from the encrypted stream by the device at receiving end.

In FIG. 12, numeral 1250 indicates an example of the manner in which a combination of the synchronization marker and the VOP is detected by the device at receiving end.

In FIG. 12, numeral 1260 indicates an example of the manner in which the data between the VOP and the combination of the synchronization marker and the VOP is decrypted by the device at receiving end.

In FIG. 12, numeral 1270 indicates an example of the manner in which the VOP following the VOP data is converted to stuffing bits by the device at receiving end.

An example of the operation of the device at transmitting end is explained below.

In the device at transmitting end, the four-byte VOH and then the four-byte VOP are detected from the video stream shown by 1210 in FIG. 12. Upon detection of the next four-byte VOP, as indicated by 1220 in FIG. 12, "VOP+synchronization marker" is inserted after the data involved, i.e. VOP data, and as indicated by 1230 in FIG. 12, the portion "VOP data+VOP" is encrypted with a cryptographic key. The encrypted stream thus obtained is output to the network 2.

An example of the operation of the device at receiving end is explained below.

In the device at receiving end, the four-byte VOH and then the four-byte VOP are detected from the encrypted stream as indicated by 1240 in FIG. 12. As indicated by 1250 in FIG. 12, "synchronization marker+VOP" of eight bytes in total is detected, so that as indicated by 1260 in FIG. 12, the data between the detected VOP and the neighboring "synchronization marker+VOP" is decrypted with the cryptographic key.

In the process, it is determined whether the start code (VOP in this case) appears or not at the end of the decrypted data.

The bit sequence coincident with the start code (VOP in this case) fails to appear in the non-header part ("header of several bytes" and "VOP data" in this case). In the case where the start code appears at the end of the decrypted data, therefore, it is determined that the particular start code is the start code in the "start code+synchronization marker" inserted after the non-header part by the device at transmitting end. Specifically, it is determined that the "synchronization marker+start code" detected earlier is not the dummy code in the encrypted data but a valid "synchronization marker+start code".

In the device at receiving end, as indicated by 1270 in FIG. 12, VOP after the VOP data is converted into stuffing bits. By this conversion to the stuffing bits, the device at receiving end is not required to delete the added start code (i.e. the stuffing bits in this case) and advance the following data forward. After that, a similar operation is repeated by the device at receiving end.

In this case, the stuffing bits have patterns of 0, 01, 011, 0111, ..., 01111111, ..., and each boundary can be detected by finding "0" at the time of decoding in the reverse direction. In the case where the video stream with the stuffing bits added thereto is expanded, therefore, the stuffing bits are ignored.

In view of this, according to this example, the value of the stuffing bits is set to (7F FF FF FF)h (four bytes) and the value of the synchronization marker to (FF FF FF FF)h (four bytes), so that the value of "stuffing bits+synchronization marker" is set to (7F FF FF FF FF FF FF FF)h (eight bytes). In this case, "stuffing bits+synchronization marker" also constitutes the stuffing bits and is not required to be deleted.

In the case where a dummy code is erroneously detected from the encrypted data by the device at receiving end, a similar process to that explained with reference to 810 to 850 in FIG. 8 is executed.

In this way, by attaching "start code+synchronization marker" after the non-header part and encrypting "non-header part+start code", the dummy code contained in the encrypted stream is prevented from being erroneously detected as a valid start code.

EXAMPLE 2-6

Figure 13:
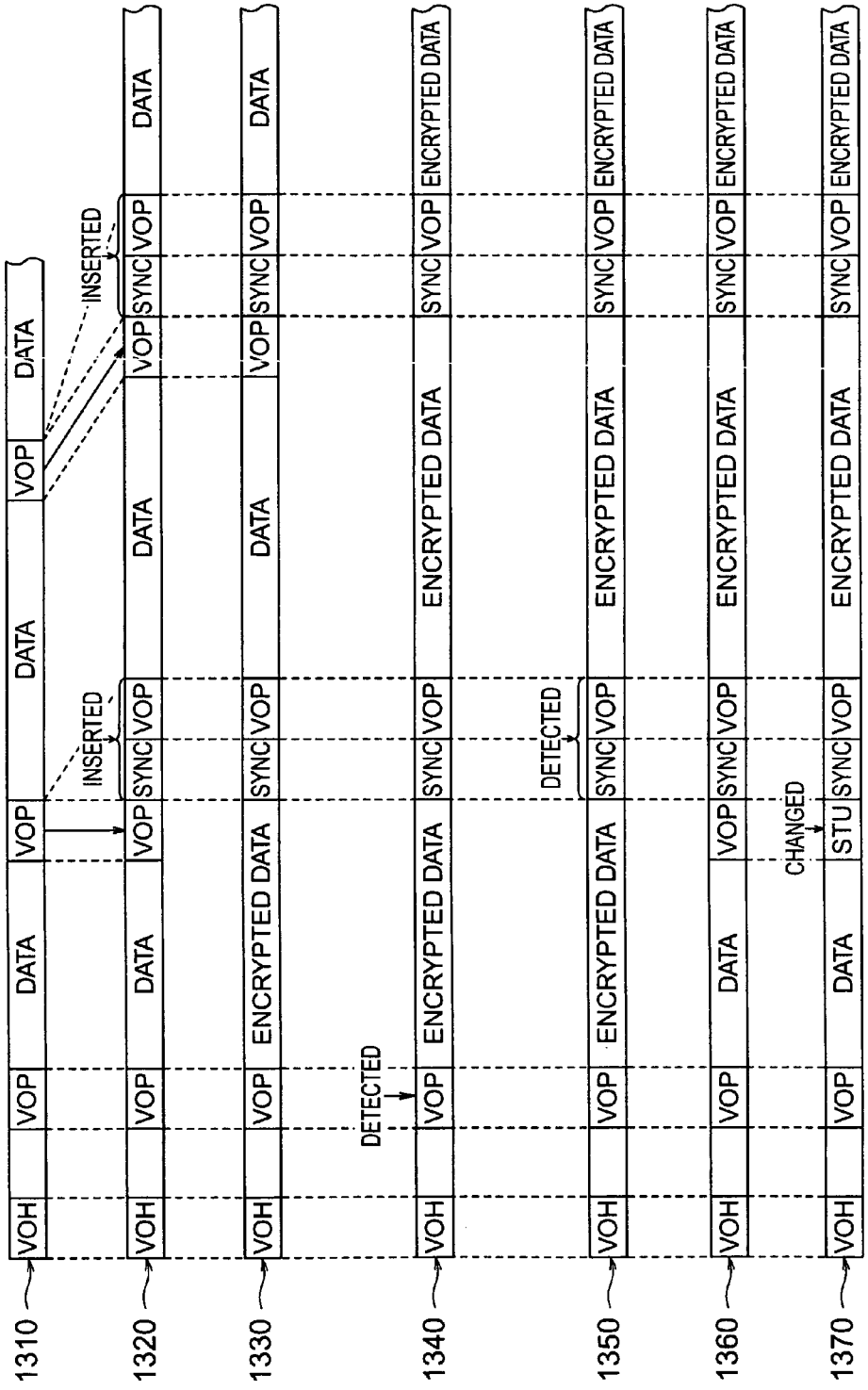
FIG. 13 is a diagram showing another example of the manner in which, after a synchronization marker and a start code are added following another start code, a non-header part and the one start code are encrypted in the VOP-based encryption.

Numerals 1310 to 1370 in FIG. 13 designate an example of the VOP-based encryption executed by a method of encrypting "non-header part+start code" by adding "synchronization marker+start code" after the start code. The synchronization marker has, for example, four bytes.

In this example, the VOP (indicating "vop_start_code" in this case) after the VOP data in the received stream is converted into the stuffing bits, and therefore, VOP is used as the start code in "synchronization marker+start code" added after the start code portion in the transmitted stream by the device at transmitting end.

In this example, "synchronization marker", "vop_start_code" are inserted in the bit sequence of "vop_start_code", "header of several bytes", "VOP data" thereby to generate the bit sequence "vop_start_code", "synchronization marker", "vop_start_code", "header of several bytes", "VOP data".

An explanation is given below about a case in which the device at receiving end validly detects "synchronization marker+VOP" from the encrypted stream.

In FIG. 13, numeral 1310 indicates an example of the video stream before encryption by the device at transmitting end.

In FIG. 13, numeral 1320 indicates an example of the video stream with the synchronization marker (SYNC) and the VOP inserted after the VOP by the device at transmitting end.

In FIG. 13, numeral 1330 indicates an example of the manner in which the data (non-encrypted data) and the VOP are encrypted by the device at transmitting end. In this encrypted stream, the data and the following VOP portion are encrypted to form the encrypted data. In this example, "header of several bytes" following the VOP located on the left side is also encrypted.

In FIG. 13, numeral 1340 indicates an example of the manner in which the VOP is detected from the encrypted stream by the device at receiving end.

In FIG. 13, numeral 1350 indicates an example of the manner in which a combination of the synchronization marker and the VOP is detected by the device at receiving end.

In FIG. 13, numeral 1360 indicates an example of the manner in which the data between the VOP and the combination of the synchronization marker and the VOP is decrypted by the device at receiving end.

In FIG. 13, numeral 1370 indicates an example of the manner in which the VOP following the VOP data is converted into the stuffing bits by the device at receiving end.

An example of the operation of the device at transmitting end is explained below.

In the device at transmitting end, the four-byte VOH ("video_object_start_code" in this case) and then the four-byte VOP are detected from the video stream shown by 1310 in FIG. 13. Upon detection of the next four-byte VOP, as indicated by 1320 in FIG. 13, "synchronization marker+VOP" is inserted after this VOP, and as indicated by 1330 in FIG. 13, the portion "VOP data+VOP" is encrypted with a cryptographic key. The encrypted stream thus obtained is output to the network 2.

An example of the operation by the device at receiving end is explained.

In the device at receiving end, the four-byte VOH and then the four-byte VOP are detected from the encrypted stream as indicated by 1340 in FIG. 13. As indicated by 1350 in FIG. 13, "synchronization marker+VOP" of eight bytes in total is detected, so that as indicated by 1360 in FIG. 13, the data between the detected VOP and the neighboring "synchronization marker+VOP" is decrypted with the cryptographic key.

In the process, it is determined whether the start code (VOP in this case) appears or not at the end of the decrypted data.

The bit sequence coincident with the start code (VOP in this case) fails to appear in the non-header part ("header of several bytes" and "VOP data" in this case). In the case where the start code appears at the end of the decrypted data, therefore, it is determined that the particular start code is the one inserted following the non-header part in the device at transmitting end. Specifically, it is determined that the "synchronization marker+start code" detected earlier is not the dummy code in the encrypted data but a valid "synchronization marker+start code".

In the device at receiving end, as indicated by 1370 in FIG. 13, the VOP after the VOP data is converted into the stuffing bits. As the result of this conversion to the stuffing bits, the device at receiving end is not required to delete the start code (i.e. the stuffing bits in this case) and advance the following data forward. After that, a similar operation is repeated by the device at receiving end.

In the case where a dummy code is erroneously detected from the encrypted data by the device at receiving end, a similar process to that explained with reference to 810 to 850 in FIG. 8 is executed.

In the case where the VOH appears in the second and subsequent sessions, a different process from the one described above is executed. Specifically, "synchronization marker+VOH" is inserted after VOH as indicated by 1320 in FIG. 13, "non-encrypted data+VOH" is encrypted as indicated by 1330 in FIG. 13, "synchronization marker+VOH" is detected as indicated by 1350, and the VOH after the VOP data is converted into the stuffing bits as indicated by 1370 in FIG. 13. Also, the device at receiving end checks at the time of decryption of the encrypted data whether VOH appears at the end of the decrypted data or not.

In this way, by attaching "synchronization marker+start code" after the start code and encrypting "non-header part+ start code", the dummy code contained in the encrypted stream is prevented from being erroneously detected as a valid start code.

EXAMPLE 2-7

In the "Example 2-1", "Example 2-2" or "Example 2-5" described above, the device at transmitting end inserts VOP after the VOP data, and encrypts the VOP data and the VOP.

According to this example, such a process is executed independently (regardless of the synchronization marker, for example). Also, the device at receiving end can be configured to convert the inserted VOP into the stuffing bits.

The configuration according to this example can determine whether the start code portion detected at the time of decryption is a valid data or a dummy code by determining whether the VOP appears or not at the end of the decrypted data.

EXAMPLE 2-8

In the "Example 2-1", "Example 2-5" or "Example 2-7" described above, the device at transmitting end uses VOP as the start code to be inserted together with the synchronization marker (or the start code to be inserted in "Example 2-7"). Instead of this start code, other unique code may be used.

In this example, the data other than VOP is used in place of the start code.

Also with the configuration of this example, the same code (the same data) can be set as the start code in the devices at both transmitting and receiving ends. In this way, the process can be executed using this code.

EXAMPLE OF OPERATION

Figure 14:
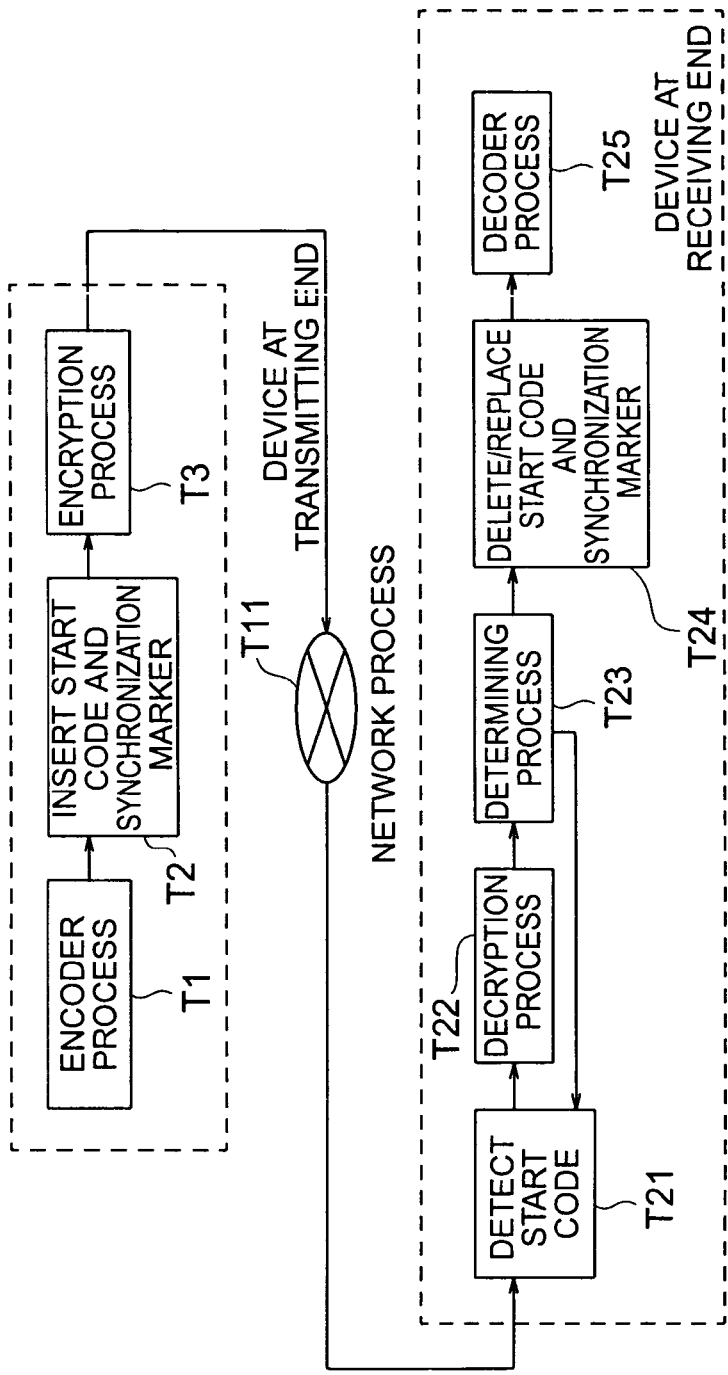
FIG. 14 is a diagram showing an example of the operation process executed by an encrypted data communication system.

With reference to FIG. 14, an example of the operation carried out in the encrypted data communication system according to this embodiment is explained. The case shown by 710 to 770 in FIG. 7 and 810 to 850 in FIG. 8 is described below as an embodiment.

An example of the operation of the device at transmitting end is explained below.

In the device at transmitting end, first, the encoder process T1 is supplied with a video stream 710 as shown by 710 in FIG. 7. The video stream compressed and output by the encoder process T1 is sent to the insertion process T2 of the start code and the synchronization marker. In the start code and the synchronization marker insertion process T2, as shown by 720 in FIG. 7, for example, the start code and the synchronization marker are added at a predetermined position of the video stream. The video stream with the start code and the synchronization marker added thereto in this way is sent to the encryption process T3.

In the encryption process T3, as shown by 730 in FIG. 7, this video stream is encrypted. The encrypted video stream (encrypted stream) is sent to the device at receiving end through a network process T11.

The network process T11 executes the process (for example, coding or decoding) required to transmit the encrypted stream from the device at transmitting end to the device at receiving end. Also, in the case where the data accumulation and distribution unit is connected to the network, the network process T11 is configured in such a manner that the encrypted stream is distributed from the device at transmitting end to the device at receiving end through the data accumulation and distribution unit.

An example of the operation of the device at receiving end is explained below.

The device at receiving end sends the received encrypted video stream (encrypted stream) to the start code detection process T21. The start code detection process T21, as shown by 740, 750 in FIG. 7, detects VOH, VOP and "synchronization marker+VOP" from the encrypted stream.

In the decryption process T22, as shown by 760 in FIG. 7, the data between VOP and "synchronization marker+VOP" in the encrypted stream is decrypted.

The determining process T23 determines whether the VOP appears or not at the end of the decrypted data in the decrypted video stream, and upon determination that the VOP has appeared, determines that "synchronization marker+VOP" has been validly detected by the start code detection process T21. In the determining process T23, as indicated by 770 in FIG. 7, the decrypted video stream is sent to the process T24 for deleting and replacing the start code and the synchronization marker.

Upon determination by the determining process T23, as indicated by 810, 820 in FIG. 8, that no VOP appears at the end of the decrypted data in the decrypted video stream as indicated by 830 in FIG. 8., it is determined that a dummy code has been erroneously detected by the start code detection process T21, and the start code detection process T21 is instructed to return the erroneously decrypted data to the original encrypted data.

In the start code detection process T21, in response to the instruction, as indicated by 840 in FIG. 8, for example, the encrypted data before decryption stored in a memory (not shown) is inserted in the original position, and as indicated by 850 in FIG. 8, the VOH, VOP and "synchronization marker+ VOP" are detected from the portion of the video stream including and subsequent to the erroneously detected dummy code.

In the process T24 for deleting and replacing the start code and the synchronization marker, as shown in each example described above, the start code and the synchronization marker are deleted from the decrypted video stream or the start code is replaced with the stuffing bit, and the resulting video stream is sent to the decoder process T25. In the decoder process T25, the decrypted video stream is expanded.

Although FIGS. 7, 8 are shown above to explain an embodiment, other drawings are also applicable.

Figure 15:
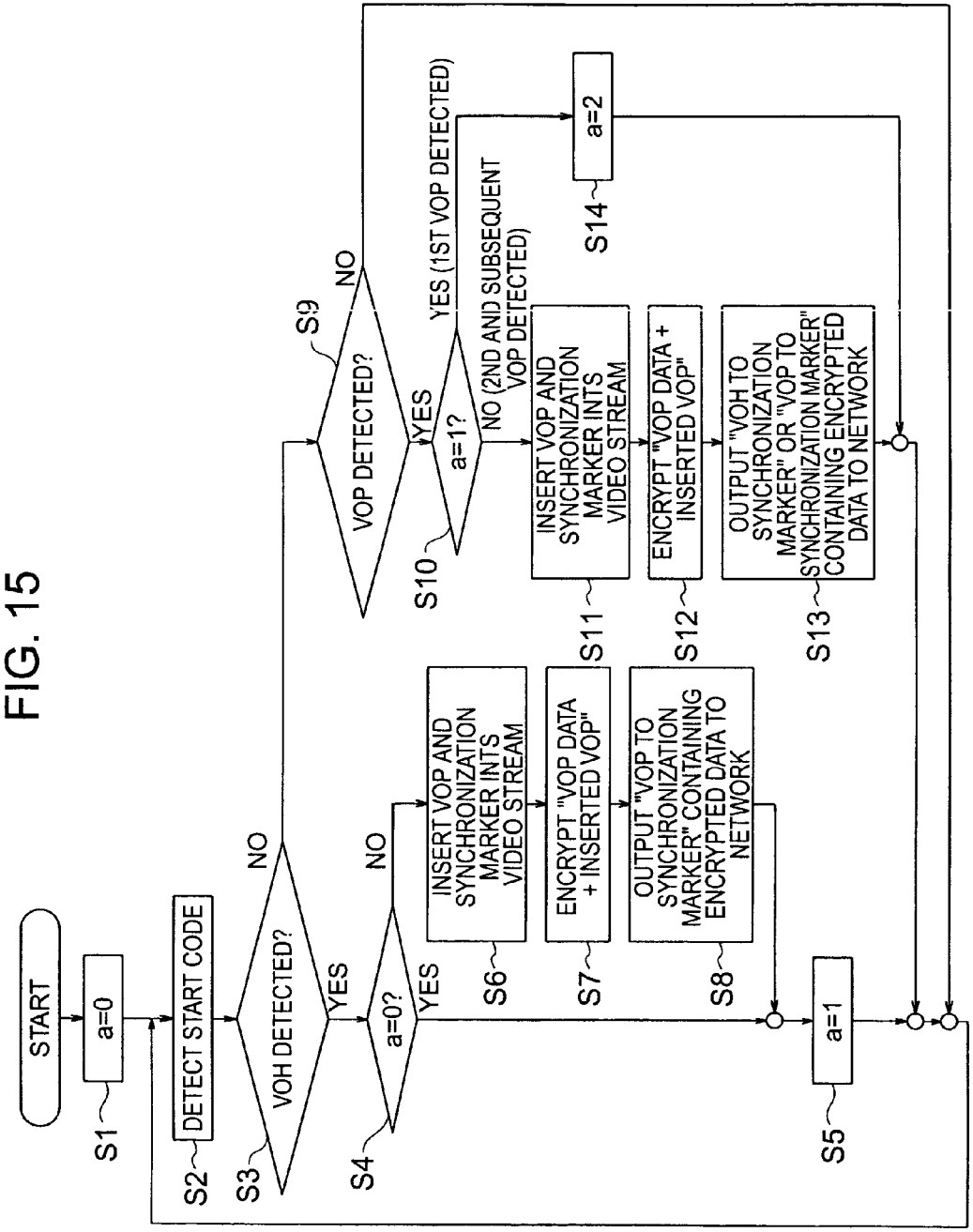
FIG. 15 is a diagram showing an example of the steps of the operation process executed by the device at transmitting end.

With reference to FIG. 15, an example of steps of the operation carried out by the device at transmitting end is explained.

This embodiment represents the case shown by 710 to 770 in FIG. 7 and 810 to 850 in FIG. 8 as an example.

In this embodiment, the variable $\underline{a}$ is a state variable, according to the value of which the operation is switched.

First, the operation is started and the state variable $\underline{a}$ is initialized to 0 (step S1). Then, the process of detecting the start code in the video stream is executed (step S2).

Upon detection of the VOH from the video stream as shown by 710 in FIG. 7 (step S3), the value of the state variable $\underline{a}$ is checked (step S4). Since $\underline{a}$=0, the value of a is set to 1 (step S5), after which the process of detecting the start code from the video stream is executed again (step S2).

Next, upon detection of the VOP from the video stream (detection of first VOP) (step S9), the value of the state variable $\underline{a}$ is checked (step S10). Since $\underline{a}$=1, this value is set to 2 (step S14), after which the process of detecting the start code from the video stream is executed again (step S2).

Next, upon detection of the VOP from the video stream (detection of second and subsequent VOPs) (step S9), the value of the state variable $\underline{a}$ is checked (step S10). Since $\underline{a}$=2, as indicated by 720 in FIG. 7, the VOP and the synchronization marker are inserted in the video stream (step S11).

Next, as indicated by 730 in FIG. 7, "VOP data+inserted VOP" is encrypted (step S12). Then, "video stream from VOH to synchronization marker" including the encrypted data is output to the network (step S13). Then, the process of detecting the start code from the video stream is executed again (step S2).

After that, upon detection of the VOP from the video stream (step S9), the value of the state variable $\underline{a}$ is checked (step S10). Since $\underline{a}$=2, the VOP and the synchronization marker are inserted in the video stream (step S1), "VOP data+inserted VOP" is encrypted (step S12), and "video stream from VOP to synchronization marker" including the encrypted data is output to the network (step S13). After that, the process of detecting the start code from the video stream is executed again (step S2), and the operation similar to the aforementioned operation is repeatedly carried out.

Upon detection of the VOH from the video stream (step S3), the value of the state variable $\underline{a}$ is checked (step S4). Since $\underline{a}$=2, the VOP and the synchronization marker are inserted in the video stream (step S6), "VOP data+inserted VOP" is encrypted (step S7), and "video stream from VOP to synchronization marker" including the encrypted data is output to the network (step S8). After that, the state variable $\underline{a}$ is set to 1 (step S5), and the process of detecting the start code from the video stream is executed again (step S2).

Subsequently, the operation similar to the aforementioned operation is repeatedly carried out.

Figure 16:
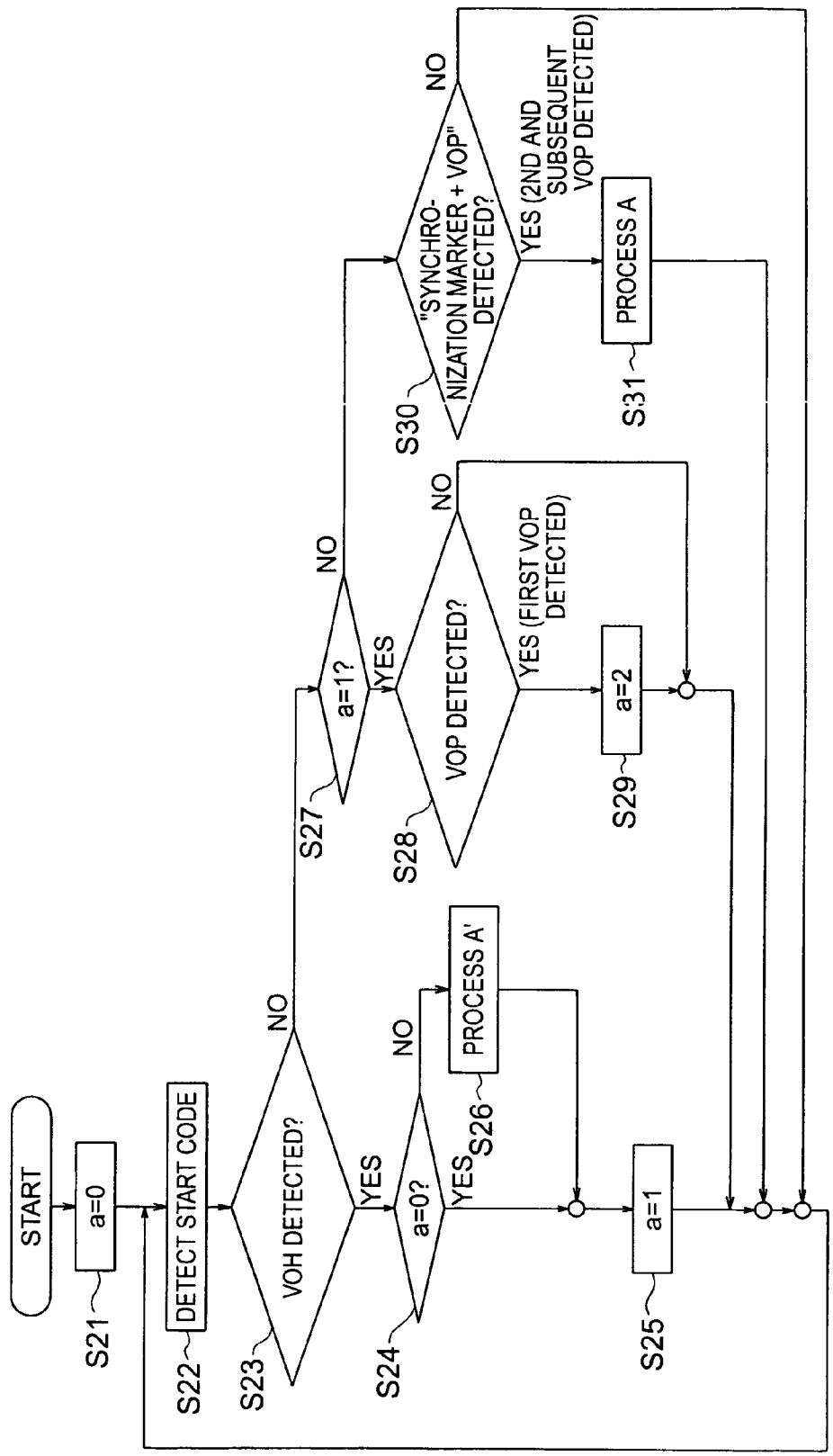
FIG. 16 is a diagram showing an example of the steps of the operation process executed by the device at receiving end.
Figure 17:
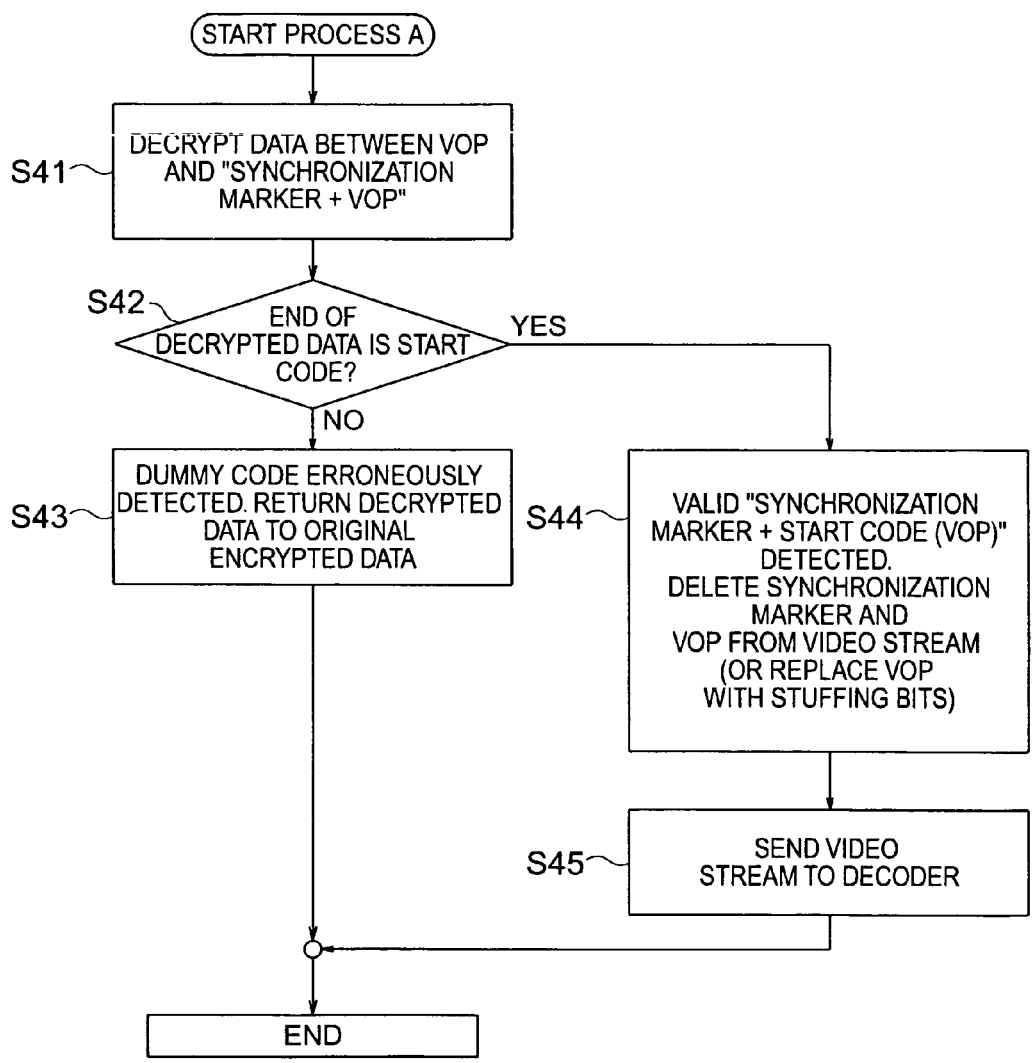
FIG. 17 is a diagram showing another example of the steps of the operation process executed by the device at receiving end.
Figure 18:
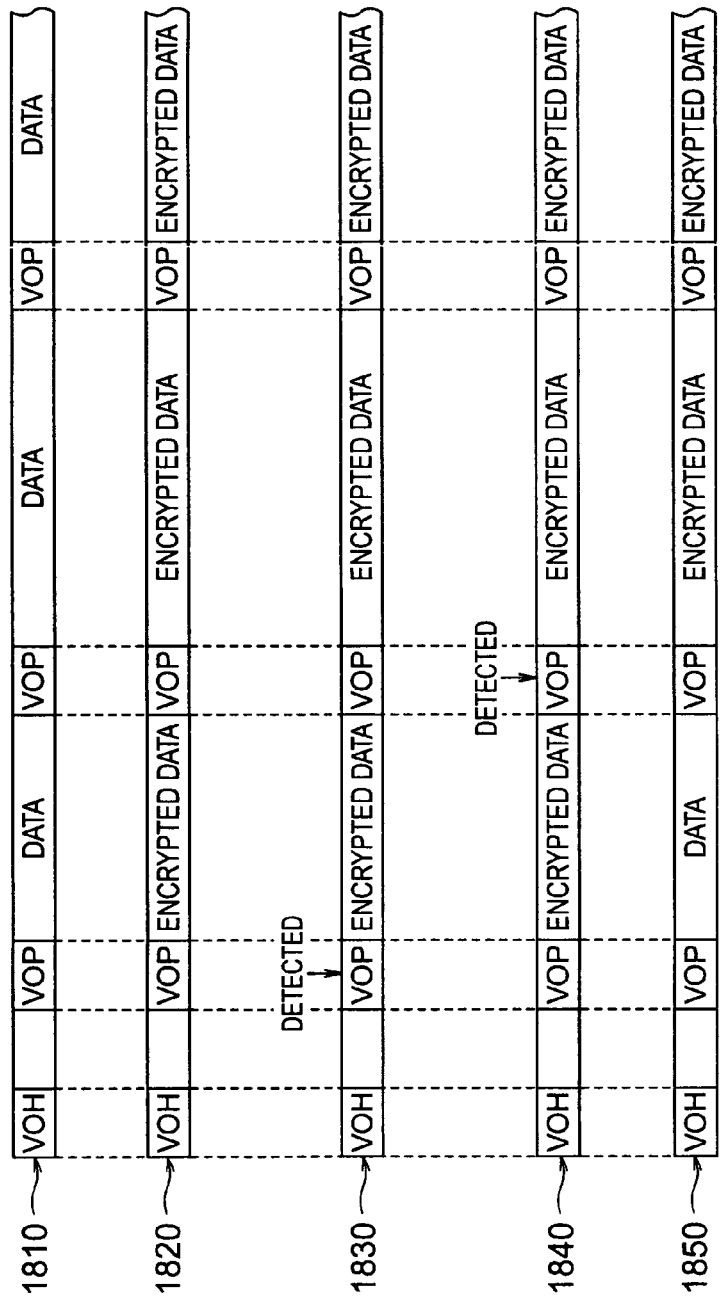
FIG. 18 is a diagram showing an example of the manner in which the video stream is encrypted and decrypted according to the prior art.

With reference to FIGS. 16, 17, an example of the steps of the process executed by the device at receiving end is explained below.

In this embodiment, the case shown by 710 to 770 in FIG. 7 and 810 to 850 in FIG. 8 is explained as an example.

In this embodiment, the variable $\underline{a}$ is a state variable, according to the value of which the operation is switched.

In the device at receiving end, with the start of operation, the state variable $\underline{a}$ is initialized to 0 (step S21). Then, the process of detecting the start code from the video stream (encrypted stream) is executed (step S22).

Upon detection of the VOH from the encrypted stream as shown by 740 in FIG. 7 (step S23), the value of the state variable $\underline{a}$ is checked (step S24). Since $\underline{a}$=0, the value $\underline{a}$ is set to 1 (step S25), after which the process of detecting the start code from the encrypted stream is executed again (step S22).

Next, while the value of the state variable $\underline{a}$ is 1 (step S27), assume that the VOP is detected from the video stream (detection of first VOP) (step S28). After setting the value of the state variable $\underline{a}$ to 2 (step S29), the process of detecting the start code from the encrypted stream is executed again (step S22).

Next, while the value of the state variable $\underline{a}$ is 2 (step S27), as indicated by 750 in FIG. 7, assume that "synchronization marker+VOP" is detected from the encrypted stream (detection of second and subsequent VOPs) (step S30). A predetermined process is executed.

In the process A, as indicated by 760 in FIG. 7, the data between the VOP and "synchronization marker+VOP" is first decrypted (step S41). In the case where the end of the decrypted data is the start code (VOP in this case) (step S42), the valid detection of "synchronization marker+VOP" is determined. In this case, as indicated by 770 in FIG. 7, the VOP and the synchronization marker at the end of the decrypted data are deleted from the video stream (step S44), after which "video stream from VOH to VOP data" is sent to the decoder 15 (step S45).

In the example indicated by 1210 to 1270 in FIG. 12 and 1310 to 1370 in FIG. 13, the VOP at the end of the decrypted data is replaced with the stuffing bits (step S44), and "video stream from VOH to synchronization marker" is sent to the decoder 15 (step S45). In the case where the end of the decrypted data is not the start code (VOP in this case) (step S42), on the other hand, the erroneous dummy code is detected and therefore the decrypted data is returned to the original encrypted data (step S43).

After execution of the process A, the execution of detecting the start code from the encrypted stream is executed again (step S22).

Upon subsequent detection of "synchronization marker+VOP" from the encrypted stream (step S30), the process A is executed (step S31). In the process A, as in the aforementioned case, the data between VOP and "synchronization marker+VOP" is decrypted (step S41). In the case where the end of the decrypted data is the start code (VOP in this case) (step S42), the valid detection of "synchronization marker+VOP" is determined. In this case, the VOP and the synchronization marker at the end of the decrypted data are deleted from the video stream (step S44), after which "video stream from VOP to VOP data" is sent to the decoder 15 (step S45).

In the example shown by 1210 to 1270 in FIG. 12 and 1310 to 1370 in FIG. 13, the VOP at the end of the decrypted data is replaced with the stuffing bits (step S44) and "video stream from VOP to synchronization marker" is sent to the decoder 15 (step S45).

After that, the process of detecting the start code from the encrypted stream is executed again (step S22).

Next, upon detection of VOH from the encrypted stream (step S23), the value of the state variable $\underline{a}$ is checked (step S24). Since a=2, a similar process A' is executed as in the aforementioned case (step S26).

In the process A', as in the aforementioned case, the data between VOP and "synchronization marker+VOH" is decrypted. In the case where the end of the decrypted data is the start code (VOP in this case), the valid detection of "synchronization marker+VOH" is determined. In this case, the VOP and the synchronization marker at the end of the decrypted data are deleted from the video stream, after which "video stream from VOP to VOP data" is sent to the decoder 15.

In the example shown by 1210 to 1270 in FIG. 12 and 1310 to 1370 in FIG. 13, the VOP at the end of the decrypted data is replaced with the stuffing bits and "video stream from VOP to synchronization marker" is sent to the decoder 15.

After that, the state variable $\underline{a}$ is set to 1 (step S25), and then the process of detecting the start code from the encrypted stream is executed again (step S22).

Subsequently, a similar operation is repeatedly carried out.

As shown in each example described above, in the encrypted data communication system according to this embodiment, the device at transmitting end inserts the start code and the synchronization marker (or only the start code) after the non-header part of the video stream thereby to encrypt the particular non-header part and the start code.

As an alternative, in the encrypted data communication system according to this embodiment, the device at transmitting end inserts the synchronization marker and the start code after the start code portion (referred to as the start code portion P in this case) of the video stream thereby to encrypt the particular non-header part and the start code. The synchronization marker is a four-byte data (XX XX XX XX)h or stuffing bits, as an example.

Also, in the encrypted data communication system according to this embodiment, the device at receiving end deletes the start code and the synchronization marker (or only the start code) after the non-header part at the time of decryption of the encrypted data.

Alternatively, in the encrypted data communication system according to this embodiment, the device at receiving end deletes the synchronization marker and the start code after the start code (or only the start code) at the time of decryption of the encrypted data.

As another alternative, in the encrypted data communication system according to this embodiment, the device at receiving end replaces the start code following the non-header part with the stuffing bits at the time of decryption of the encrypted data.

Also, in the encrypted data communication system according to this embodiment, assume that the start code appears at the end of the decrypted data at the time of decryption of the encrypted data. The device at receiving end determines that a valid combination of the synchronization marker and the start code has been detected and decrypted. In the case where no start code appears at the end of the decrypted data, on the other hand, the decryption of the dummy code is determined and the decrypted data is returned to the original encrypted data, followed by retrieval of a combination of the synchronization marker and the start code again.

In the encrypted data communication system according to this embodiment, therefore, the length of the start code is substantially lengthened by the provision of the synchronization marker as described above. In this way, the probability of appearance of the same value (dummy code) as the start code portion (a combination of synchronization marker and VOP in this case) used with the non-header part (which includes "header of several bytes" and may include the VOP header in this case) in the encrypted stream can be reduced.

Also, in the encrypted data communication system according to this embodiment, it is determined whether a synchronization marker and a start code (or only a start code) are validly detected or not at the time of decryption, thereby preventing the erroneously detected dummy code from being left as it is.

In this way, in the case where the encrypted stream is decrypted by a personal computer at receiving end, the dummy code contained in the encrypted stream is prevented from being erroneously detected as a valid start code for an improved accuracy of image reproduction.

The second embodiment primarily has been shown to represents the VOP-based encryption. Like in the first embodiment, however, the invention is applicable also to the VOH-based encryption with equal effect.

Also, the second embodiment shows a case using "the bit sequence of the marker for determination (the start code in this case), the synchronization marker and the start code) as described above. As an alternative, "the bit sequence of the marker for determination (the start code, for example), the start code and the sync maker" may be used. In other words, the synchronization marker may be inserted either before or after the start code.

In the conversion to the stuffing bits as shown in FIGS. 12, 13, however, "the bit sequence of the marker for determination (the start code converted into the stuffing bits in this case), the synchronization marker and the start code" is used.

The encrypted data communication system, the device at transmitting end or the device at receiving end according to this invention are not necessarily limited to the configurations described above, but various other configurations can be employed.

Also, this invention can be provided, for example, as a method or a scheme for executing the process according to the invention, a program for executing the method and the system, a recording medium for recording the program, or as various devices and systems.

Further, the field of application of this invention is not necessarily limited to those described above, and can cover various fields. For example, the invention is applicable to a video surveillance system.

The foregoing description represents an application of the invention to the MPEG-4 encoding scheme. Nevertheless, other encoding schemes such as MPEG-2 or H.264 are also included in the proposed applications of the invention.

The stuffing bits of MPEG-4 correspond to the stuffing bytes of MPEG-2, and the zero byte can be used as a similar function for H.264.

Further, although this embodiment is described as an application of the invention to the stream cipher, this invention is also applicable to the block cipher as well.

Also, the various processes executed in the encrypted data communication system, the device at transmitting end and the device at receiving end according to the invention may use a configuration controlled, for example, by a processor executing a control program stored in a ROM (read-only memory) in the hardware resources having the processor and a memory. Further, each function unit for executing the processes may be configured as an independent hardware circuit.

Furthermore, this invention can be grasped as a computer-readable recording medium such as a floppy (trade mark) disk or CD-ROM (compact disc ROM) having the control program stored therein, and by inputting the control program to the computer from the recording medium for execution in the processor, the processes according to the invention can be executed.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An encrypted data communication system for communicating an encrypted stream from a device at a transmitting end to a device at a receiving end, the encrypted stream being generated by encrypting a video stream with a start code which is a unique code,
   wherein the device at transmitting end includes:
   an encryption processing unit for encrypting at least one part of the video stream, without the start code, by an exclusive-OR operation of a random number and at least one part of the video stream, and
   a transmitter for transmitting the encrypted stream including the video stream at least one part of which is encrypted without the start code, and the start code being not encrypted, and a synchronization marker which is arranged before or after the start code; and wherein the device at receiving end includes:

a receiver for receiving the encrypted stream, a detector for detecting a sequence of the start code and the synchronization marker from the received encrypted stream to determine that the detected start code is valid, and a decryptor for decrypting the received video stream at least one of which is encrypted without the start code, based on a position at which the start code is detected.

2. The encrypted data communication system according to claim 1, wherein the video stream is encoded by a predetermined compressing and encoding scheme, wherein the video stream at least one of which is encrypted without the start code by the encryption processing unit is a data portion corresponding a header portion including the start code, and wherein the synchronization marker includes a stuffing bit, a stuffing byte, a zero byte determined by the predetermined compressing and encoding scheme, is arranged before the start code, is not encrypted, and is transmitted by the transmitting unit.

3. The encrypted data communication system according to claim 2, wherein the device at transmitting end further includes:

a determination marker insertion unit for inserting a predetermined determination marker arranged after the data portion, wherein the encryption processing unit encrypts the data portion including the inserted determination marker, wherein the device at the receiving end includes a determining unit for determining, if a sequence of the data portion and the determination-marker are decrypted, that a valid location identification code is detected, and for determining, if otherwise, that a dummy code is detected, and wherein the device at the receiving end includes a deletion unit for deleting the determination marker of the detected sequence of the data portion and the determination marker or for converting the determination marker into the stuffing bit, the stuffing byte, or the zero byte.

4. An encrypted data communication system for communicating an encrypted stream from a device at a transmitting end to a device at a receiving end, the encrypted stream being generated by encrypting a video stream with a start code which is a unique code, wherein the device at the transmitting end includes:

a generating unit for generating a data stream by encrypting at least one part of the video stream, without the start code, by an exclusive-OR operation of a random number and at least one part of the video stream, and transmitting the encrypted stream including the video stream at least one part of which is encrypted without the start code, and the start code being not encrypted, and a synchronization marker which is arranged before or after the start code, and wherein the device at the receiving end includes:

a receiver for receiving the encrypted stream, a detector for detecting a sequence of the start code and the synchronization marker from the received encrypted stream to determine that the detected start code is valid, and a decryptor for decrypting the received video stream at least one of which is encrypted without the start code, based on a position at which the start code is detected, wherein a predetermined determination marker is arranged after the data portion and the data portion is encrypted including the inserted determination marker, wherein, if a sequence of the data portion and the determination-marker are decrypted, it is determined that a valid location identification code is detected, if otherwise, a dummy code is detected, and wherein the determination marker of the detected sequence of the data portion and the determination marker are deleted, or the determination marker is converted into the stuffing bit, the stuffing byte, or the zero byte.

5. A method of decrypting an encrypted stream in an encrypted data communication system for communicating the encrypted stream from a device at a transmitting end to a device at a receiving end, the encrypted stream being generated by encrypting a video stream with a start code which is a unique code, wherein the device at transmitting end includes:

an encryption processing unit for encrypting at least one part of the video stream, without the start code, by an exclusive-OR operation of a random number and at least one cart of the video stream, and a transmitter for transmitting the encrypted stream including the video stream at least one part of which is encrypted without the start code, and the start code being not encrypted, and a synchronization marker which is arranged before or after the start code, said method comprising the steps of:

receiving the encrypted stream;

detecting a sequence of the start code and the synchronization marker from the received encrypted stream to determine that the detected start code is valid; and decrypting the received video stream, at least one of which is encrypted without the start code, based on a portion at which the start code is detected.

6. The encrypted data communication system according to claim 2, wherein the device at transmitting end includes a synchronization marker insertion unit for inserting the synchronization marker arranged before the start code before the video stream is encrypted.

7. An encrypted data communication system for encrypting a video stream including a header portion and a non-header portion and the header portion having an original start code which is a unique code, and for communicating the encrypted video stream from a device at transmitting end to a device at receiving end, wherein the device at transmitting end inserts a sequence, arranged after the original start code originally included in the video stream, of a predetermined synchronization marker and a further start code which is the same code as the original start code originally included in the video stream, wherein the device at transmitting end transmits the video stream encrypted by an exclusive-OR operation of a random number and both of the non-header portion and the original start code arranged after the non-header portion, wherein the device at receiving end decrypts the encrypted video stream based on a position at which the sequence of the synchronization marker and the inserted further start code is detected from the received encrypted video stream if the sequence of the synchronization marker and the inserted further start code is detected, wherein the device at receiving end determines that the detected sequence is invalid if a final data portion of the decrypted video stream does not include the original start code, and wherein the device at receiving end deletes a sequence of the synchronization marker and the original start code originally included in the decrypted video stream or the sequence of the synchronization marker and the inserted further start code in the decrypted video stream into the synchronization marker or converts it into a stuffing bit, a stuffing byte or a zero byte.

* * * * *